United States Patent
Ruffini et al.

(10) Patent No.: US 9,608,752 B2
(45) Date of Patent: Mar. 28, 2017

(54) SYSTEMS AND METHODS OF TRANSPORTING INTERNAL RADIO BASE STATION (RBS) INTERFACE INFORMATION OVER A PACKET SWITCHED NETWORK

(71) Applicant: TELEFONAKTIEBOLAGET L M ERICSSON (PUBL), Stockholm (SE)

(72) Inventors: Stefano Ruffini, Rome (IT); Gregory Mirsky, Pleasanton, CA (US); Eric Ward Gray, Pitman, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 14/746,213

(22) Filed: Jun. 22, 2015

(65) Prior Publication Data

US 2016/0337062 A1 Nov. 17, 2016

Related U.S. Application Data

(60) Provisional application No. 62/162,441, filed on May 15, 2015.

(51) Int. Cl.
*H04J 3/06* (2006.01)
*H04W 56/00* (2009.01)

(52) U.S. Cl.
CPC .......... *H04J 3/0667* (2013.01); *H04J 3/0658* (2013.01); *H04J 3/0694* (2013.01); *H04W 56/00* (2013.01)

(58) Field of Classification Search
CPC . H04W 56/00; H04W 56/0075; H04J 3/0667; H04J 3/0652; H04J 3/0658;

(Continued)

(56) References Cited

U.S. PATENT DOCUMENTS 8,064,485 B1 * 11/2011 Montini ................ H04J 3/0667
370/503
8,416,763 B1 * 4/2013 Montini ................ H04J 3/0667
370/350

(Continued)

FOREIGN PATENT DOCUMENTS

EP 2 276 298 A1 1/2011
WO WO 2014/037061 A1 3/2014

OTHER PUBLICATIONS

CPRI Specification V6.1 (Jul. 1, 2014), Common Public Radio Interface (CPRI); Interface Specification, the whole document.

(Continued)

*Primary Examiner* — Afsar M Qureshi

(57) ABSTRACT

Systems and methods of transporting internal radio base station (RBS) interface information over a packet network are presented. In one exemplary embodiment, in an interworking function (IWF) for communicating packets between a radio equipment (RE) and a radio equipment controller (REC) of a radio base station (RBS), a method may include receiving a packet sent from another IWF and having internal RBS interface information and residence time measurement (RTM) information that characterizes an asymmetry between processing times on links in different directions between the RE and the REC. Further, the method may include determining an asymmetry compensation that compensates for the asymmetry using the RTM information. Also, the method may include applying the asymmetry compensation to a timestamp of the internal RBS interface information to obtain an updated internal RBS interface information. In addition, the method may include transmitting the updated internal RBS interface information to one of the RE and the REC that is attached to the IWF.

21 Claims, 18 Drawing Sheets

(58) Field of Classification Search
CPC ... H04J 3/0694; H04B 1/7073; H04B 1/7087; H04B 1/7156; H04B 1/7183
USPC .................................................. 370/345–350
See application file for complete search history.

(56) References Cited

U.S. PATENT DOCUMENTS

| | | | | |
|---|---|---|---|---|
| 9,331,837 | B2* | 5/2016 | Xu | H04L 7/0016 |
| 2013/0202291 | A1* | 8/2013 | Cavaliere | H04B 10/07 398/33 |
| 2014/0185601 | A1 | 7/2014 | Ilyadis | |
| 2014/0192826 | A1* | 7/2014 | Zampetti | H04B 10/07 370/503 |
| 2015/0372776 | A1* | 12/2015 | He | H04L 5/1469 398/28 |
| 2016/0170437 | A1* | 6/2016 | Aweya | G06F 1/12 713/503 |

OTHER PUBLICATIONS

IEEE P802.1Qbv/D2.3, Draft Standard for Local and Metropolitan Area Networks—Bridges and Bridged Networks—Amendment: Enhancements for Scheduled Traffic, Apr. 3, 2015, the whole document.
IEEE 1588-2008—IEEE Standard for a Precision Clock Synchronization Protocol for Networked Measurement and Control Systems, (Revision of IEEE Std 1588-2002), Jul. 24, 2008, the whole document.
China Mobile Communications Corporation, International Telecommunication Union, COM 15—C 0924—E, "Fronthaul synchronization requirements", Geneva, Nov. 2014, the whole document.
Mirsky G. et al., "Residence Time Measurement in MPLS network draft-mirsky-mpls-residence-time-06", MPLS Working Group Internet-Draft, May 2, 2015.
Korhonen J., "Radio over Ethernet Considerations", IEEE1904.3 TF, Feb. 2015, Louisville, CO, USA, the whole document.
IEEE P802.1Qbu/D2-1, Draft Standard for Local and Metropolitan Area Networks—Media Access Control (MAC) Bridges and Virtual Bridged Local Area Networks—Amendment: Frame Preemption, Feb. 13, 2015, the whole document.
Nadeau T. et al., RFC 5085, Network Working Group, "Pseudowire Virtual Circuit Connectivity Verification (VCCV): A Control Channel for Pseudowires", Dec. 2007, the whole document.
Bryant S. et al., RFC 4385, "Pseudowire Emulation Edge-to-Edge (PWE3)Control Word for Use over an MPLS PSN", Feb. 2006, the whole document.

\* cited by examiner

| 0001 801 | VERSION 803 | REVERSED 805 | RESIDENCE TIME MEASUREMENT CHANNEL ID 807 |
|---|---|---|---|
| | | | SCRATCH PAD 809 |
| | TYPE 811 | | LENGTH 813 |
| | | | VALUE 815 |

BY A FIRST INTERWORKING FUNCTION (IWF) FOR COMMUNICATING PACKETS BETWEEN A RADIO EQUIPMENT (RE) AND A RADIO EQUIPMENT CONTROLLER (REC) OF A RADIO BASE STATION (RBS), RECEIVE A FORWARD PACKET SENT FROM THE SECOND IWF AND HAVING A FORWARD RESIDENCE TIME MEASUREMENT (RTM) INFORMATION THAT CHARACTERIZES A PACKET DELAY VARIATION (PDV) OF THE FORWARD PACKET ON A FORWARD LINK — 1401

↓

DETERMINE AN RTM ASSOCIATED WITH THE FIRST IWF PROCESSING THE FORWARD PACKET — 1403

↓

UPDATE THE FORWARD RTM INFORMATION OF THE FORWARD PACKET USING THE RTM ASSOCIATED WITH THE FIRST IWF PROCESSING THE FORWARD PACKET — 1405

↓

DETERMINE A PDV COMPENSATION THAT COMPENSATES FOR THE PDV OF THE FORWARD PACKET ON THE FORWARD LINK USING THE FORWARD RTM INFORMATION — 1407

↓

APPLY THE PDV COMPENSATION TO A TRANSMISSION TIME OF THE FORWARD INTERNAL RBS INTERFACE INFORMATION TO OBTAIN A COMPENSATED TRANSMISSION TIME — 1409

↓

TRANSMIT, TO THE RE, THE UPDATED FORWARD INTERNAL RBS INTERFACE INFORMATION AT THE COMPENSATED TRANSMISSION TIME — 1411

FIG. 14

SYSTEMS AND METHODS OF TRANSPORTING INTERNAL RADIO BASE STATION (RBS) INTERFACE INFORMATION OVER A PACKET SWITCHED NETWORK

CROSS-REFERENCE TO RELATED APPLICATIONS

This application claims priority to U.S. Provisional App. No. 62/162,441, filed May 15, 2015, which is hereby incorporated by reference as if fully set forth herein.

FIELD OF USE

This application generally relates to the field of communications and more specifically to systems and methods of transporting internal radio base station (RBS) interface information over a packet switched network.

BACKGROUND

In a typical cellular radio system, wireless user equipment units (UEs) communicate via a radio access network (RAN) to one or more core networks. The user equipment units (UEs) may be mobile telephones laptop computers with mobile termination, and thus may be, for example, portable, pocket, hand-held, computer-included, or car-mounted mobile devices which communicate voice and/or data with radio access network. Alternatively, the wireless user equipment units may be fixed wireless devices, e.g., fixed cellular devices/terminals which are part of a wireless local loop or the like. The RAN covers a geographical area which is divided into cell areas, with each cell area being served by a radio base station (RBS) such as a base transceiver station (BTS) or a NodeB/eNodeB. Each RBS communicates over an air interface with UEs that are within range. In the RAN, for 2G and 3G, multiple RBSs are typically coupled such as by landline or microwave to a control node known as a base station controller (BSC) or a radio network controller (RNC). The control node supervises and coordinates various activities of the multiple RBSs coupled thereto. Control nodes are typically coupled to one or more core networks. One example of a RAN is the Universal Mobile Telecommunications System (UMTS) Terrestrial Radio Access Network (UTRAN). UMTS is a third generation system which builds upon the radio access technology known as Global System for Mobile communications (GSM). UTRAN provides wideband code division multiple access (WCDMA) to UEs. Further evolution of mobile technology has moved towards Long-Term Evolution (LTE) and LTE Advanced technologies having similar architectures.

In many RANs, each RBS is located at a single site. However, RBSs may have a distributed architecture. For example, a distributed RBS architecture may take the form of one or more radio equipment (RE) portions that are linked to a radio equipment control (REC) portion over an internal RBS interface.

Such distributed RBS architecture may have a main processor at each REC, and a set of antennas with dedicated RF equipment able to cover multiple radio cells at each RE, where the main processor may be shared among multiple REs. This architectural may provide higher capacity, lower cost, and lower latency between the RECs and the REs. The Common Public Radio Interface (CPRI) is an example of an internal RBS interface that links an RE portion of the radio base station to a radio equipment control portion of the base station. Other interfaces may be used, for example the Open Base Station Architecture Initiative (OBSAI).

This approach of providing "remotization" of the RE portion of the RBS from the REC portion may bring some notable advantages, including:

a) rationalization of RBS processing unit, with benefits in terms of cost and power consumption;

b) dynamic allocation of RF and/or processing resources depending on cell load and traffic profiles; and c) correlation of data supported by all the antennas which are afferent on the same processing unit, which increases radio link reliability, bandwidth, and coverage and optimizes the power consumption.

This may enable some "cloud computing" concepts to be applied to the RANs. Point to point (P2P) optical links are currently generally used for the interface between the REC and the RE. For this interface, WDM systems, especially the ones used in the access (WDM-PON), may be used as they may enable guaranteed low latency, protocol transparency, high bandwidth and an increased spectral efficiency. Notably CPRI has pressing constraints in terms of latency (round-trip delay) and in particular in terms of uplink/downlink synchronization.

The CPRI standard recites optical fibers for transmission link up to ten kilometers (10 km), recites determining a round trip delay, and specifies synchronization and timing accuracies, e.g. link round trip delay accuracy of sixteen nanoseconds (16 nsec.).

As previously mentioned, an RBS is functionally separated into an RE and an REC. An RE may also be referred to as a radio resource unit (RRU). An REC may also be referred to as a digital unit (DU) or a baseband unit (BBU). The RE converts a transmit baseband signal to a transmit radio frequency (RF) signal and then feeds the transmit RF signal to an antenna. Further, the RE receives an RF signal from the antenna and converts the received RF signal to a received baseband signal. The REC generates the transmit baseband signal and processes the received baseband signal.

In a conventional wireless mobile network, the antenna, RE and REC are typically integrated into a single network node and placed at a cell site. As data rates and the number of subscribers continue to increase, the coverage area of typical cell sites may decrease. As the coverage area decreases, additional cell sites may be required. However, adding cell sites results in higher costs for network operators, since each cell site typically includes a source of power, real estate and a cell tower.

To address these issues, a RAN architecture has been developed to allow each RE to be geographical separated from its corresponding REC. By doing so, each REC may be co-located at a centralized location while each RE may be located at a corresponding cell site. An RE located at a cell site may also be referred to as a remote radio unit (RRU). Further, a point-to-point link may be used to couple a RE and an REC.

An interface specification for communications between an RE and an REC has been developed. The most widely adopted specification is the CPRI such as described by CPRI Specification Version 6.1. The CPRI specification describes the interface between a RE and an REC of the RBS system. FIG. 1 illustrates a CPRI reference scheme in an RBS system.

Current industry trends show a large number of REs distributed over a geographical area, with their corresponding RECs pooled at a centralized location, which is also referred as a baseband hotel. Further, the centralized pool of RECs is used to control the large number of REs distributed over the geographical area. This network architecture is commonly referred as C-RAN, which may also be referred to as cloud RAN, centralized RAN or coordinated RAN. The term cloud RAN is typically used to emphasize that RAN functions are virtualized in a centralized off-the-shelf server. The term centralized RAN is typically used to emphasize that RAN is managed by pooling RECs in a centralized location, which may also be referred to as an REC pool site. The term coordinated RAN is typically used to recognize the benefit of having RECs in the same location for coordination and cooperative transmission/reception of data.

In a C-RAN system, mobile traffic such as CPRI traffic is communicated over a communication link between the REC pool site and each RE site. This communication link is typically over a long distance and may also be referred to as a fronthaul. The communication link may have a forward link from the REC to the RE and a reverse link from the RE to the REC. For CPRI traffic, the communication link must meet certain performance requirements such as latency, jitter and symmetry. In particular, the overall latency over the network is typically within about one hundred microseconds (100 usec.). Further, the asymmetry between the forward and reverse transmissions is typically on the order of tens of nanoseconds. Also, the jitter is typically a few parts per billion.

The requirement for a symmetric network is associated with the need to calibrate for the overall delay. Further, the ability to meet this requirement becomes more challenging for a communication link using packet communications. This requires the reverse traffic packet and the corresponding forward traffic packet between the REC and the RE to be symmetric within a requirement of a few nanoseconds. For example, a thirty-two nanosecond (32 nsec.) asymmetry corresponds to sixteen nanoseconds (16 nsec.) error in the measurement of the overall delay. In fact, link delay calibration may be performed using a calculation of the round trip delay. FIG. 2 illustrates calibration of link delay in an RBS system using CPRI.

With these requirements, the transport of CPRI traffic over a traditional packet network in an RBS system is impractical due to at least packet delay variation (PDV) and asymmetry. However, the use of packet technologies to transport fronthaul traffic provides the ability to optimize resources among other things.

Various standards setting projects are ongoing to define the transport of time-sensitive traffic such as by using scheduled traffic principles described in IEEE802.1bv. In one example, IEEE802.1bv describes techniques to minimize or remove the impact of buffers on time sensitive traffic. Further, FIG. 3 illustrates establishing a guard band as described by IEEE802.1bv.

In another example, IEEE802.1 (P802.1Qbu) is defining mechanisms to support frame pre-emption in IEEE802.1Q bridges such as interrupting and delaying the transmission of a frame to allow transmission of a higher priority frame. This bridging mechanism relies on media access control (MAC) interfaces defined in IEEE802.3br.

Other similar initiatives have also commenced within the Deterministic Network Working Group (WG) of the Internet Engineering Task Force (IETF).

In addition, standards projects are ongoing to redefine the CPRI specification, including removing overhead from the CPRI traffic by reassigning functions from the REC to the RE. These projects assume that timing information is carried out-of-band such as by using IEEE1588 and not by the CPRI traffic per current practices. This assumption allows for various implementation options. For instance, CPRI traffic may be retimed at the edge of a packet network to filter out PDV and to equalize delays such as processing delays on both forward and reverse directions. This method may be implemented in the RE or external to the RE such as to support a legacy RE.

Furthermore, the transport of CPRI traffic over a packet network requires specific mapping procedures. For instance, the IEEE1904.3 standards group is investigating mechanisms analogous to the PWE (Pseudo-Wire Emulation) CW (Control Word). Further, generalized associated channel (G-ACh)-based residence time measurement (RTM) may be used by time synchronization protocols to transport packets over a multi-protocol label switching (MPLS) domain, in practice applying similar concepts to the transparent clock functions defined by IEEE1588. Specific aspects of this technique associated with 2-step clock principles have been patented by Ericsson, the assignee of the present application.

Existing solutions for the transport of CPRI traffic over a traditional packet network in a C-RAN system suffer from a number of problems. For instance, the transport of CPRI traffic over a packet network is currently not feasible due to PDV and asymmetry induced by the packet technologies. These problems lead to exceeding the stringent timing requirements of the CPRI traffic. A solution to these problems is to allow the transport of timing sensitive information, which is currently being discussed in the IEEE802.1 Time-Sensitive Networking (TSN) group. Some of the proposals for this solution require time synchronization by the packet nodes, apply scheduled traffic principles, and assume that all packet nodes are synchronized by IEEE1588-PTP. In practice, a time division multiplexing (TDM) approach is assumed such as having fixed timeslots allocated to specific traffic classes over a packet network. Such a solution may result in meeting a PDV requirement and having controlled latency.

However, the use of these principles is not sufficient to carry CPRI traffic over a packet switched network (PSN). In particular, the IEEE802.1 specifications may not fully address latency or PDV (packet delay variation). For instance, contention among traffic belonging to the same traffic class such as two CPRI traffic flows being contemporaneously received by the same node is not fully addressed even though a common case in CPRI scenarios. Further, contention among CPRI and non-CPRI traffic flows is also not addressed, preventing the use of multi-purpose packet nodes.

As previously mentioned, asymmetry may be corrected if the precision time protocol (PTP) is distributed to all nodes, as assumed in the IEEE802.1bv specification. By doing so, the actual end-to-end delays, in both directions, may be measured and used to compensate for asymmetry. However, requirements for delivering PTP to all network nodes might be an issue considering the level of accuracy required. Accordingly, there is a need for improved techniques for transporting internal RBS interface information over a packet switched network. In addition, other desirable features and characteristics of the present disclosure will become apparent from the subsequent detailed description and claims, taken in conjunction with the accompanying figures and the foregoing technical field and background.

The Background section of this document is provided to place embodiments of the present disclosure in technological and operational context and to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiments of the present invention relate to transporting internal radio base station (RBS) interface information over a packet switched network. According to one aspect, in an interworking function (IWF) for communicating packets between a radio equipment (RE) and a radio equipment controller (REC) of a radio base station (RBS), a method may include receiving a packet sent from another IWF and having internal RBS interface information and residence time measurement (RTM) information that characterizes an asymmetry and packet delay between processing times on links in different directions between the RE and the REC. Further, the method may include determining an asymmetry compensation that compensates for the asymmetry using the RTM information. Also, the method may include applying the asymmetry compensation to a timestamp of the internal RBS interface information to obtain an updated internal RBS interface information or may include applying a predefined delay to result in symmetric paths. In addition, the method may include transmitting the updated internal RBS interface information to one of the RE and the REC that is attached to the IWF. In addition, the method may include normalization of the delay of the packets applying some predefined value as to remove packet delay variation.

It is important to recognize that while the techniques discussed herein are directed at an RBS, such techniques may be applied to any system having a packet-switched network. For instance, the techniques of reducing the effects of asymmetry and PDV may be applied to other systems incorporating a packet-switched network.

According to another aspect, an IWF for communicating packets between an RE and an REC of an RBS may be configured to include a processor operationally coupled to a first interface circuit and a second interface circuit. The first interface circuit may be configured to receive a packet sent from another IWF and having an internal RBS interface information and an RTM information that characterizes an asymmetry between processing times on links in different directions between the RE and the REC. Further, the processor may be configured to determine the asymmetry compensation that compensates the asymmetry using the RTM information. The processor may be further configured to apply the asymmetry compensation to a timestamp of the internal RBS interface information to obtain an updated internal RBS interface information. Also, the second interface circuit may be configured to transmit the updated internal RBS interface information to one of the RE and the REC that is attached to the IWF.

According to another aspect, a system for communicating packets between an RE and an REC of an RBS may be configured to include a first IWF operationally coupled to the RE and a second IWF operationally coupled between the first IWF and the REC. The first IWF may be configured to receive a forward packet transmitted from the second IWF having a forward internal RBS interface information and a forward RTM information that characterizes a forward PDV of the forward packet on a forward link. In addition, the first IWF may be further configured to determine a forward PDV compensation that compensates for the forward PDV using the forward RTM information. The first IWF may be further configured to apply the forward PDV compensation to a forward transmission time of the forward internal RBS interface information to obtain a compensated forward transmission time. Also, the first IWF may be further configured to transmit, to the RE, the updated forward internal RBS interface information at the compensated forward transmission time. The second IWF may be configured to receive a reverse packet sent from the first IWF and having a reverse internal RBS interface information and a reverse RTM information that characterizes a reverse PDV of the reverse packet on a reverse link. In addition, the second IWF may be further configured to determine a reverse PDV compensation that compensates for the reverse PDV using the reverse RTM information. Also, the second IWF may be further configured to apply the reverse PDV compensation to a reverse transmission time of the reverse internal RBS interface information to obtain a compensated reverse transmission time. The second IWF may be configured to transmit, to the REC, the updated reverse internal RBS interface information at the compensated reverse transmission time.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 8 provides a format of an RTM control message with a pseudo-wire associated channel header (PW ACH) in accordance with various aspects as described herein.

FIG. 14 provides another embodiment of a method of communicating packets between an RE and an REC of an RBS in accordance with various aspects as described herein.

DETAILED DESCRIPTION

Figure 1:
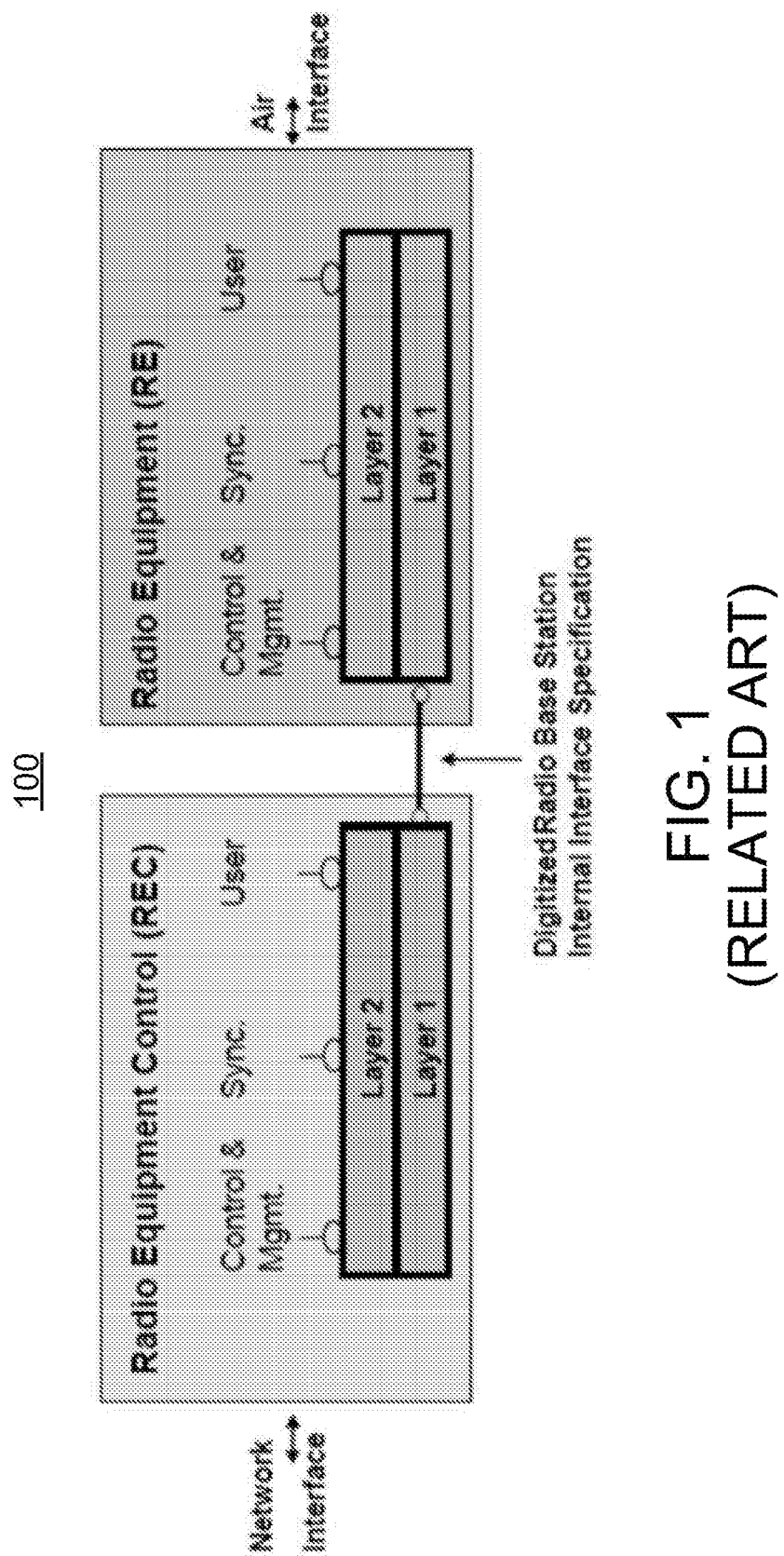
FIG. 1 illustrates a reference scheme for an RBS system using CPRI.
Figure 2:
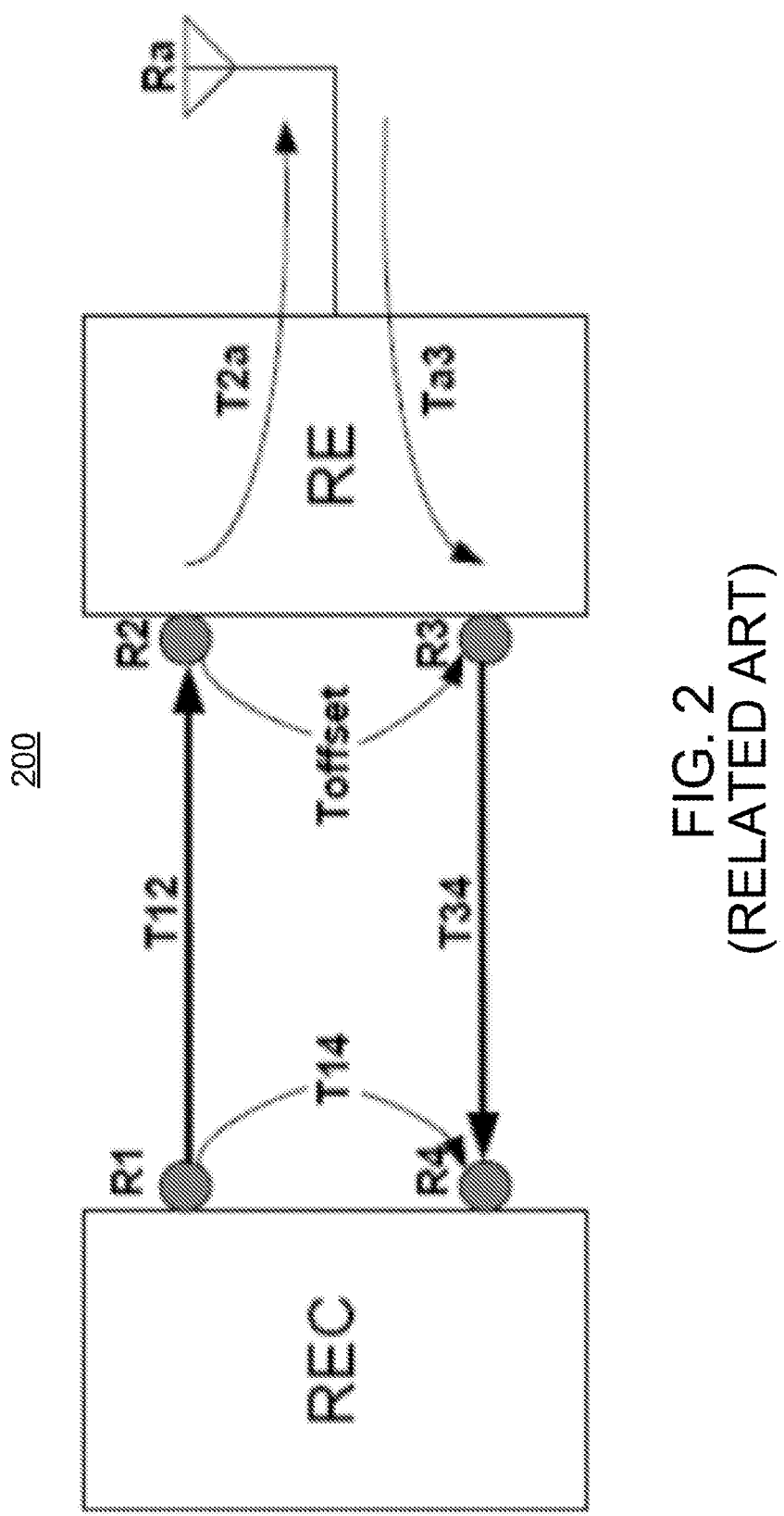
FIG. 2 illustrates calibration of link delay in an RBS system using CPRI.
Figure 3:
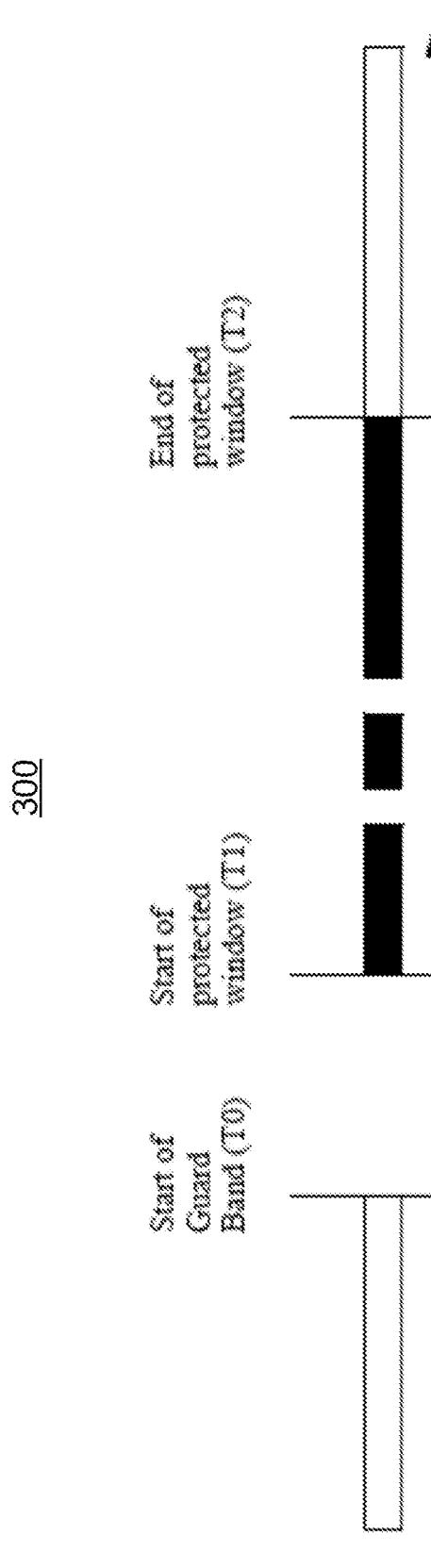
FIG. 3 illustrates establishing a guard band as described by IEEE802.1bv.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

The current disclosure describes the transport of CPRI traffic over a packet switched network in a C-RAN system and provides techniques for correcting asymmetry and packet delay variation performing contention resolution of CPRI and non-CPRI traffic flows on the same output port and multiple CPRI traffic flows on the same output port. In one exemplary embodiment, a pseudo-wire emulation (PWE) packet carrying the CPRI traffic flow may include a header having a residence time measurement (RTM). Further, the RTM carried in the header of the PWE packet may include a forward accumulated RTM and a reverse accumulated RTM. By doing so, an end node such as the RE or the REC, or an interworking function (IWF) attached to either, may use the forward and reverse accumulated residence times to compensate for asymmetry or PDV. The terms "forward" and "reverse" refer to the direction of the CPRI traffic flow with the forward direction from the REC to the RE and the reverse direction from the RE to the REC.

Existing Ethernet cable infrastructure may be used to encapsulate and transport CPRI traffic, resulting in significant cost savings. As previously mentioned, mapping CPRI traffic over Ethernet using a packet network is subject to various technical challenges including from delays, asymmetries and contentions in packet nodes. One of the advantages described by the present disclosure is that these technical challenges are reduced or removed without requiring the distribution of PTP references and without requiring complete network synchronization. This approach facilitates the transport of CPRI traffic flows across a multi-operator environment. Further, this approach may not require additional IEEE802.1 tools.

The techniques described herein may be fully or partially implemented in the RE or the REC. Further, the systems and methods described herein may be fully or partially implemented outside the RE or the REC, allowing for the use of an existing RE or REC. For any Ethernet switches operationally coupled between the RE and the REC, hardware, software or firmware may need to be implemented in each Ethernet switch to support the accumulation of RTM in the forward and reverse directions. In one example, the hardware, software or firmware implemented in each Ethernet switch may include functions analogous to the IEEE1588 transparent clock functions.

The techniques described herein may also be applied to other protocols such as PTP. For instance, applying the techniques described herein may provide a solution to the issue of layer violation created by transparent clocks such as modifying the payload of PTP packets without updating the source address of each packet.

In one embodiment, the IWF and each Residence Time Measurement (RTM)-enabled switch may evaluate the residence time of the packetized CPRI flow. In principle, this would be sufficient only for the packets carrying the CPRI timestamps when "out-of-band" means to distribute frequency synchronization are available, such as Synchronous Ethernet.

The IWF at the edge of the packet network may use the information carried in both directions of the accumulated residence time to evaluate the asymmetries of the connection and use this information for correcting the information carried in the CPRI header or properly delay the delivery of this information to the REC so as to compensate for asymmetry.

The asymmetry compensation may be calculated as the difference between the accumulated residence time in the reverse direction and the accumulated residence time in the forward direction. The accumulated asymmetry correction for the forward direction may be available in the first IWF and may be subtracted directly when adding the first IWF residence time. The second IWF may then, in the reverse direction, directly determine the asymmetry compensation.

In another embodiment, each of the values accumulated for the forward path and the reverse path may be delivered, for instance, from the first IWF to the second IWF, which may avoid the need to use negative accumulated residence time values.

The asymmetry compensation may be determined as follows:

$$T12=(T12+T34)/2-\text{Asymmetry Compensation}=(T14-T_{\mathit{offset}})/2-\text{Asymmetry Compensation}, \quad \text{(Equation 1)}$$

$$\text{where Asymmetry Compensation}=(t_{\mathit{forward}}-t_{\mathit{reverse}})/2 \quad \text{(Equation 2)}$$

Figure 4:
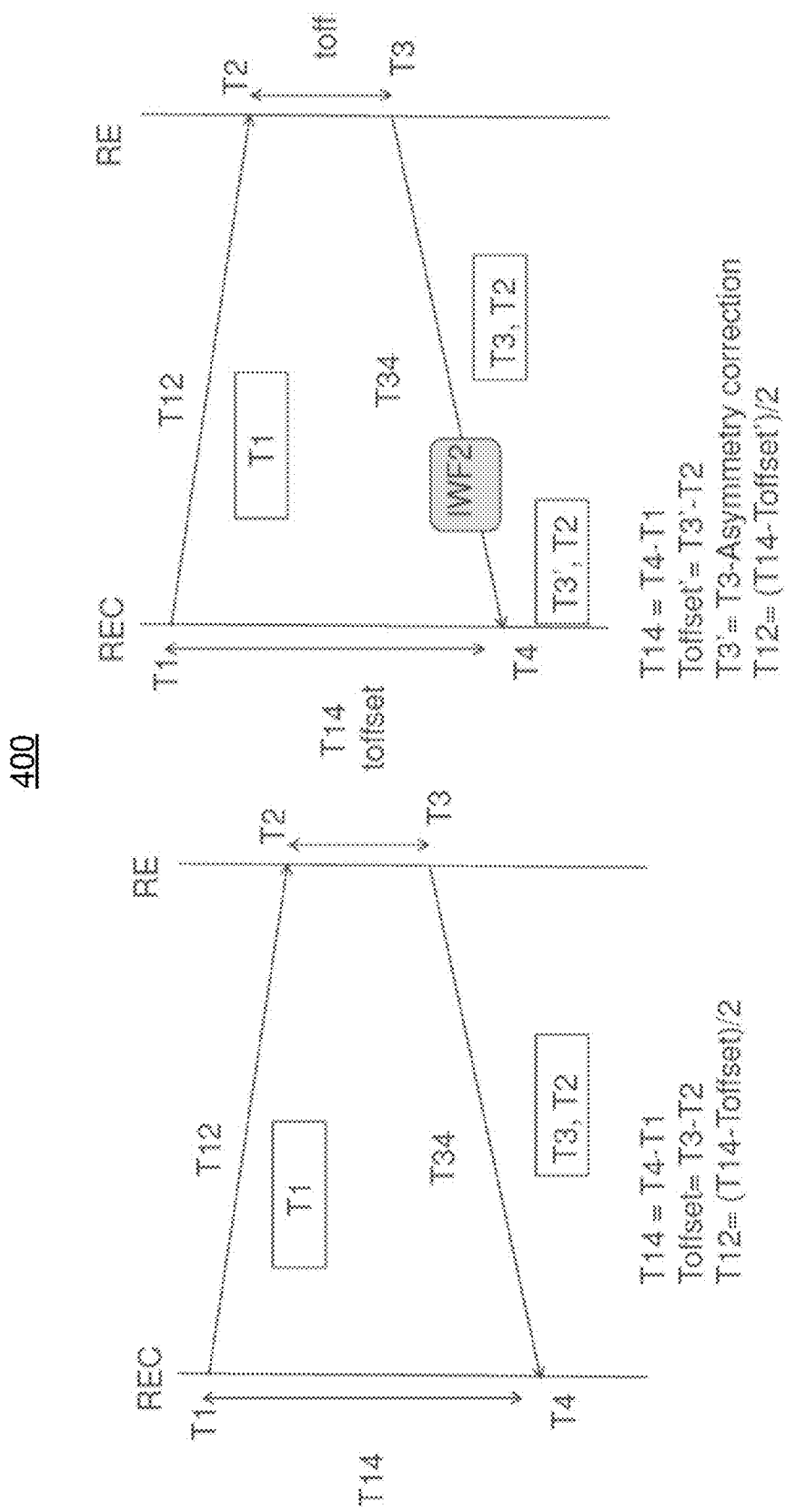
FIG. 4 provides an example application of one embodiment of a system for transporting CPRI packets over a packet switched network in accordance with various aspects as described herein.

FIG. 4 provides an example application of one embodiment of a system 400 for transporting CPRI packets over a packet switched network in accordance with various aspects as described herein. A timestamp exchange model may be used, which may be analogous to the network time protocol (NTP). The asymmetry compensation may be used to correct the T3 information, described as follows:

$$T12=(T14'-T_{\mathit{offset}}')/2 \quad \text{(Equation 3)}$$

$$\text{where } T_{\mathit{offset}}'=T3'-T2, \text{ and} \quad \text{(Equation 4)}$$

$$T3'=T3-\text{Asymmetry correction}. \quad \text{(Equation 5)}$$

Frequency synchronization may be carried using synchronous Ethernet (SyncE) and may be used to re-time the outgoing CPRI traffic towards the RE. However, if all CPRI packets are associated with their residence time, accurate frequency synchronization may be carried by the CPRI packets. Further, some processing to eliminate the PDV may be required in this case. In one example, the overall delay of the packet may be equalized by using the accumulated residence time information on a link. In another example, the IWF may use a shaping function to buffer each packet for a period of time substantially equivalent to a predefined delay of no more than the corresponding accumulated residence time. The predefined delay may be a constant value or the result of an appropriate function known to a person of ordinary skill (e.g. based on the maximum accumulated residence time, applying some constraint on the maximum allowed value depending on the applicable latency requirements). The same predefined delay and shaping function should be used in the opposite direction in order to compensate for asymmetry. In this case there should be no need to modify the information carried in the timestamp T3 as described earlier.

The synchronization of the CPRI reverse traffic carried towards the REC may be directly provided by the connected REC using a loop-timing mode.

Figure 5:
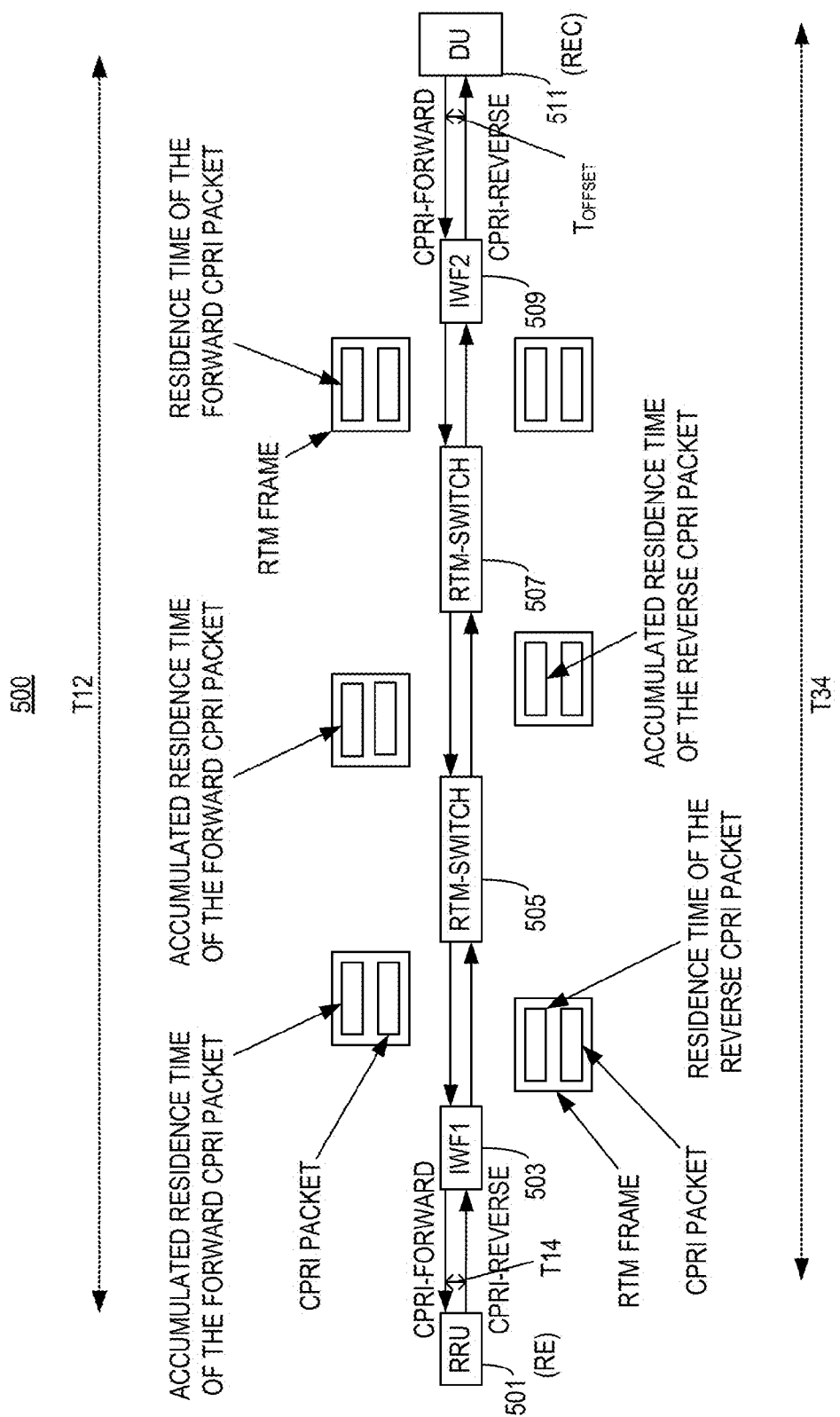
FIG. 5 illustrates another embodiment of a system for transporting CPRI packets over a packet network in accordance with various aspects as described herein.

FIG. 5 illustrates another embodiment of a system 500 for transporting CPRI packets over a packet network in accordance with various aspects as described herein. In FIG. 5, the system 500 may be configured to include an RE 501, a first IWF 503, a first switch 505, a second switch 507, a second IWF 509 and an REC 511. The RE 501 may be operationally coupled to the first IWF 503, which may also be referred to as the first IWF 503 being attached to the RE 501. Further, the REC 511 may be operationally coupled to the second IWF 509, which may also be referred to as the second IWF 509 being attached to the REC 511. The first IWF 503 and the second IWF 509 may be operationally coupled using a first switch 505 and a second switch 507 of the packet network. The first switch 505 and the second switch 507 may be used to facilitate packet communications between the first IWF 503 and the second IWF 509. The first and second IWFs 503 and 509 and the first and second switches 505 and 507 may use RTM. The first and second IWFs 503 and 509 may be standalone devices. However, the RE 501 may be configured to include the first IWF 503 and may share resources such as a processor, a memory, an interface, or the like. Similarly, the REC 511 may be configured to include the second IWF 509 and may share resources such as a processor, a memory, an interface, or the like.

In FIG. 5, in operation, the first IWF 503 may receive a reverse internal RBS interface information from the RE 501. In one example, the reverse internal RBS interface information may be a reverse CPRI message. The first IWF 503 may encapsulate the reverse internal RBS interface information and an RTM header to form a reverse packet. The RTM header may also be referred to as an RTM frame. The RTM header may include forward RTM information, reverse RTM information, forward accumulated RTM information, reverse accumulated RTM information, a running difference between forward accumulated RTM information and reverse accumulated RTM information, or the like. The first IWF 503 may determine an RTM associated with a processing time of the first IWF 503 from receiving the reverse internal RBS interface information to transmitting the reverse packet. Further, the first IWF 503 may initialize the reverse RTM information in the RTM header of the reverse packet using the RTM associated with the processing time of the first IWF 503.

Furthermore, the first switch 505 may receive the reverse packet from the first IWF 503. The first switch 505 may determine an RTM associated with a processing time of the first switch 505 from receiving to transmitting the reverse packet. Further, the first switch 505 may update the reverse RTM information of the reverse packet using the RTM associated with the processing time of the first switch 505 to obtain the reverse accumulated RTM information of the reverse packet. Similarly, the second switch 507 may receive the reverse packet from the first switch 505. The second switch 507 may determine an RTM associated with a processing time of the second switch 507 from receiving to transmitting the reverse packet. Further, the second switch 507 may update the reverse accumulated RTM information of the reverse packet using the RTM associated with the processing time of the second switch 507.

In the current embodiment, the second IWF 509 may receive the reverse packet from the second switch 507. The second IWF 509 may decapsulate the reverse packet to obtain the reverse internal RBS interface information and the RTM header. The second IWF 509 may determine an RTM associated with a processing time of the second IWF 509 from receiving the reverse packet to sending the reverse internal RBS interface information to the REC 511. Further, the second IWF 509 may update the reverse accumulated RTM information of the reverse packet using the RTM associated with the processing time of the second IWF 509. The second IWF 509 may use the reverse accumulated RTM information to determine a packet delay variation (PDV) compensation that compensates for the PDV of the reverse packet on the reverse link. In one example, the PDV compensation may be relative to a predetermined delay. Further, the second IWF 509 may apply the PDV compensation to a transmission time of the reverse internal RBS interface information to obtain a compensated transmission time. The second IWF 509 may transmit the reverse internal RBS interface information to the REC 511 at the compensated transmission time.

In FIG. 5, the second IWF 509 may receive a forward internal RBS interface information from the REC 511. In one example, the forward internal RBS interface information may be a forward CPRI message. The second IWF 509 may encapsulate the forward internal RBS interface information and an RTM header to form a forward packet. The second IWF 509 may determine an RTM associated with a processing time of the second IWF 509 from receiving the forward internal RBS interface information to sending the forward packet. Further, the second IWF 509 may initialize the forward RTM information in the RTM header of the forward packet using the RTM associated with the processing time of the forward packet by the second IWF 509. Also, the second IWF 509 may copy the reverse accumulated RTM information from the RTM header of the corresponding reverse packet to the RTM header of the forward packet.

Furthermore, the second switch 507 may receive the forward packet from the second IWF 509. The second switch 507 may determine an RTM associated with a processing time of the second switch 507 from receiving to transmitting the forward packet. Further, the second switch 507 may update the forward RTM information of the forward packet using the RTM associated with the processing time of the second switch 507 to obtain a forward accumulated RTM information of the forward packet. Similarly, the first switch 505 may receive the forward packet from the second switch 507. The first switch 505 may determine an RTM associated with a processing time of the first switch 505 from receiving to transmitting the forward packet.

Further, the first switch 505 may update the forward accumulated RTM information of the forward packet using the RTM associated with the processing time of the first switch 505.

In the current embodiment, the first IWF 503 may receive the forward packet from the first switch 505. The first IWF 503 may decapsulate the forward packet to obtain the forward internal RBS interface information and the RTM header. The first IWF 503 may determine an RTM associated with a processing time of the first IWF 503 from receiving the forward packet to transmitting the forward internal RBS interface information to the RE 501. Further, the first IWF 503 may update the forward accumulated RTM information of the forward packet using the RTM associated with the processing time of the first IWF 503. The first IWF 503 may determine an asymmetry compensation that compensates for an asymmetry between processing times on the forward link and the reverse link between the RE and the REC. In one example, the asymmetry compensation may be a difference between the forward accumulated RTM information and the reverse accumulated RTM information. The first IWF 503 may apply the asymmetry compensation to a timestamp of the forward internal RBS interface information. The first IWF 503 may use the forward accumulated RTM information to determine a packet delay variation (PDV) compensation that compensates for the PDV of the forward packet on the forward link. In one example, the PDV compensation may be relative to a predetermined delay. Further, the first IWF 503 may apply the PDV compensation to a transmission time of the forward internal RBS interface information to obtain a compensated transmission time. The first IWF 503 may transmit the forward internal RBS interface information to the REC 511 at the compensated transmission time.

Figure 6:
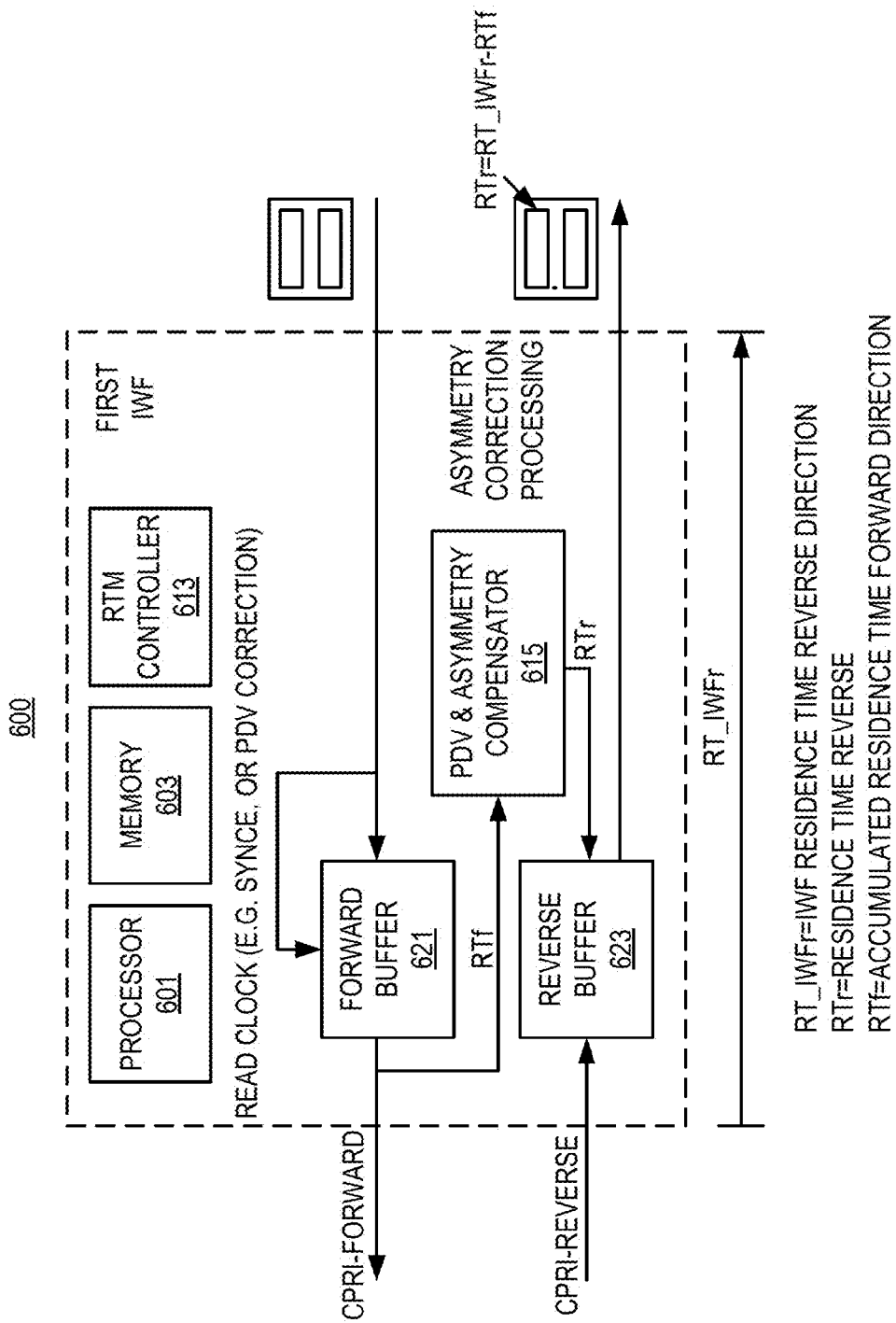
FIG. 6 illustrates one embodiment of a first IWF in accordance with various aspects as described herein.

FIG. 6 illustrates one embodiment of a first IWF 600 in accordance with various aspects as described herein. In FIG. 6, the first IWF 600 may be configured to include a processor 601 and a memory 603, and may include additional hardware, software or firmware. Further, the memory 603 may include a forward buffer 621 and a reverse buffer 623. In one example, the additional hardware, software or firmware of the first IWF 600 may include a first interface circuit, a second interface circuit, an encapsulator, a decapsulator, an RTM controller 613, a PDV and asymmetry compensator 615, or the like. The first interface may be configured to allow the first IWF 600 to interface to the RE. The second interface may be configured to allow the first IWF 600 to interface to a packet switched network. The encapsulator may be used to encapsulate a network header, a PW header, an RTM header, a reverse internal RBS interface information, or the like. The network header may include an IP header, or the like. The PW header may include an MPLS header, an L2TPv3 header, or the like. The decapsulator may be used to analyze and remove the network header and the PW header and to decapsulate the RTM header, a forward internal RBS interface information, and the like. The RTM controller 613 may be configured to perform any of the various RTM functions described herein. The PDV and asymmetry compensator 615 may be configured to perform any of the various PDV compensating functions or the asymmetry compensating functions described herein.

In FIG. 6, the second interface may receive the forward packet transmitted from a second IWF. The decapsulator may decapsulate the forward packet to obtain the forward internal RBS interface information and the RTM header. The RTM controller 613 may determine an RTM associated with a processing time of the first IWF 600 from receiving the forward packet to transmitting the forward internal RBS interface information to the RE. Further, the RTM controller 613 may update the forward accumulated RTM information of the forward packet using the RTM associated with the processing time of the first IWF 600. The PDV and asymmetry compensator 615 may determine an asymmetry compensation that compensates for an asymmetry between processing times on the forward link and the reverse link between the RE and the REC. In one example, the asymmetry compensation may be a difference between the forward accumulated RTM information and the reverse accumulated RTM information. The PDV and asymmetry compensator 615 may apply the asymmetry compensation to a timestamp of the forward internal RBS interface information. Alternatively, the PDV and asymmetry compensator 615 may determine an additive inverse of the forward accumulated RTM information of the forward packet and may initialize the reverse accumulated RTM information of the reverse packet using the additive inverse of the forward accumulated RTM information.

In the current embodiment, the PDV and asymmetry compensator 615 may use the forward accumulated RTM information to determine a PDV compensation that compensates for the PDV of the forward packet on the forward link. In one example, the PDV compensation may be relative to a predetermined delay. Further, the PDV and asymmetry compensator 615 may apply the PDV compensation to a transmission time of the forward internal RBS interface information from the forward buffer 621. The first IWF 600 may transmit the forward internal RBS interface information to the REC at the compensated transmission time.

Figure 7:
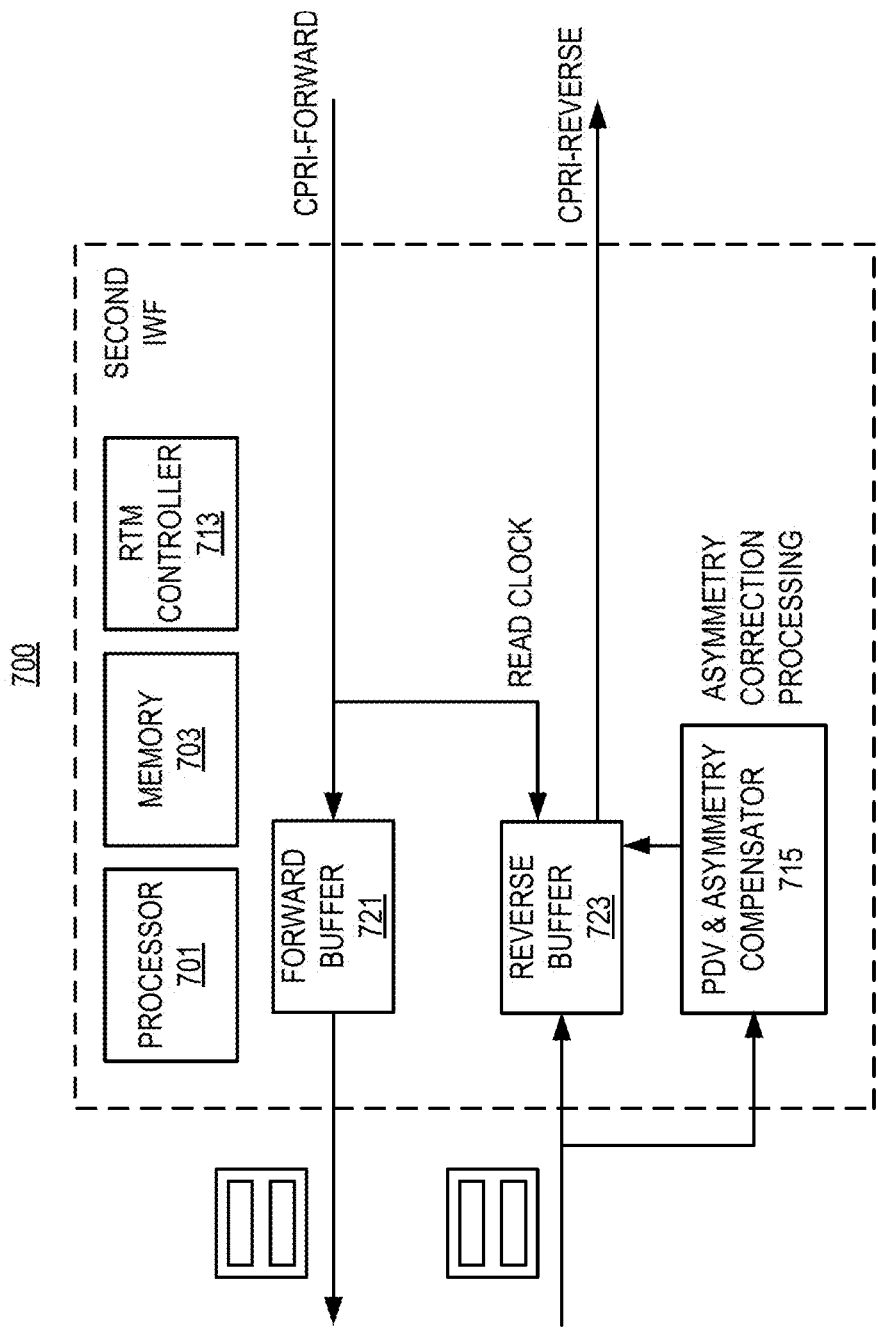
FIG. 7 illustrates another embodiment of a second IWF in accordance with various aspects as described herein.

FIG. 7 illustrates another embodiment of a second IWF 700 in accordance with various aspects as described herein. In FIG. 7, the second IWF 700 may be configured to include a processor 701 and a memory 703, and may include additional hardware, software or firmware. Further, the memory 703 may include a forward buffer 721 and a reverse buffer 723. In one example, the additional hardware, software or firmware of the second IWF 700 may include a first interface circuit, a second interface circuit, an encapsulator, a decapsulator, an RTM controller 713, a PDV and asymmetry compensator 715, or the like. The first interface may be configured to allow the second IWF 700 to interface to the REC. The second interface may be configured to allow the second IWF 700 to interface to a packet switched network. The encapsulator may be used to encapsulate a network header, a PW header, an RTM header, a forward internal RBS interface information, or the like. The decapsulator may be used to analyze and remove the network header and the PW header and to decapsulate the RTM header, a reverse internal RBS interface information, and the like. The RTM controller 713 may be configured to perform any of the various RTM functions described herein. The PDV and asymmetry compensator 715 may be configured to perform any of the various PDV compensating functions or the asymmetry compensating functions described herein.

In FIG. 7, the second IWF 700 may receive the reverse packet transmitted from a first IWF. The second IWF 700 may decapsulate the reverse packet to obtain the reverse internal RBS interface information and the RTM header. The RTM controller 713 may determine an RTM associated with a processing time of the second IWF 700 from receiving the reverse packet to sending the reverse internal RBS interface information to the REC. Further, the RTM controller 713 may update the reverse accumulated RTM information of the reverse packet using the RTM associated with the processing time of the second IWF 700. The PDV and asymmetry compensator 715 may determine an asymmetry compensation that compensates for an asymmetry between processing times on the forward link and the reverse link between the RE and the REC. In one example, the asymmetry compensation may be a difference between the forward accumulated RTM information and the reverse accumulated RTM information. The PDV and asymmetry compensator 715 may apply the asymmetry compensation to a timestamp of the forward internal RBS interface information. The PDV and asymmetry compensator 715 may use the reverse accumulated RTM information to determine a packet delay variation (PDV) compensation that compensates for the PDV of the reverse packet on the reverse link. Further, the PDV and asymmetry compensator 715 may apply the PDV compensation to a transmission time of the reverse internal RBS interface information from the reverse buffer 723. The second IWF 700 may transmit the reverse internal RBS interface information to the REC at the compensated transmission time.

In order to use RTM over Virtual Circuit Connectivity Verification (VCCV) with Associated Channel Header (ACH) (such as defined in RFC 5085 PW VCCV: A Control Channel for Pseudowires, https://tools.ietf.org/html/rfc5085), Ethernet PW must use PW CW in "Generic PW MPLS Control Word" format (such as defined in RFC 4385 Pseudowire Emulation Edge-to-Edge (PWE3) Control Word for Use over an MPLS PSN https://tools.ietf.org/html/rfc4385). For example, FIG. 8 provides a format of a residence time management (RTM) control message 800 with a pseudo-wire associated channel header (PW ACH) in accordance with various aspects as described herein. In FIG. 8, a first nibble 801 of the message 800 may be set to binary '0001' to indicate a channel associated with an Ethernet PW. A Version field 803 of the message 800 may be set to '0', such as defined in RFC 4385 Pseudowire Emulation Edge-to-Edge (PWE3) Control Word for Use over an MPLS PSN https://tools.ietf.org/html/rfc4385. A Reserved field 805 of the message 800 may be set to '0' on transmit and may be ignored on receipt. An RTM Channel ID value 807 may be allocated by IANA. A Scratch Pad field 809 may be eight octets. An optional Value field 815 may be used to carry optional sub-TLVs or a packet of a given protocol such as a time synchronization protocol. A Type field 811 may be used to identify a type of the Value field 815 that the TLV carries. The Length field 813 may include the number of octets of the Value field 815. The message 800 may be used for one-step operation.

Figure 9:
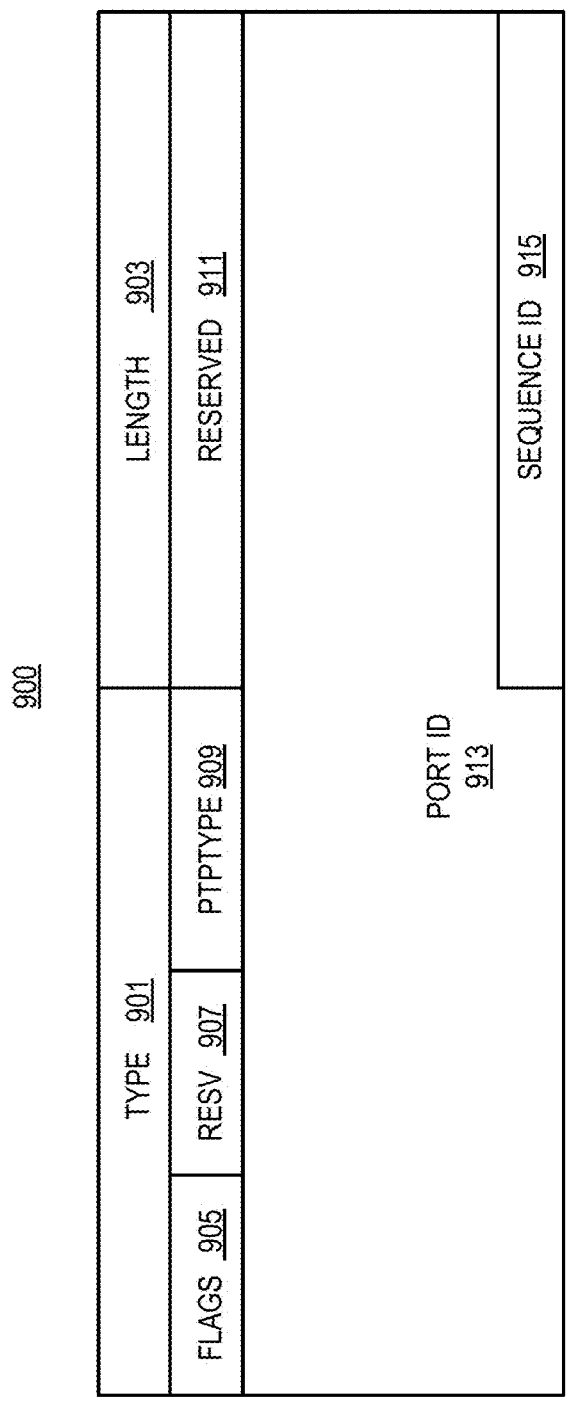
FIG. 9 provides a format of a precision time protocol (PTP) sub-TLV that precedes a PTP packet carried in the RTM TLV in accordance with various aspects as described herein.

A two-step operation may be applied in a similar way as used for PTP. In fact, the two-step operation may be applied to any L2 Client such as PTP. For example, FIG. 9 provides a format of a precision time protocol (PTP) sub-TLV message 900 that precedes a PTP packet carried in the RTM TLV message in accordance with various aspects as described herein. The Type field 901 of the message 900 may identify the PTP sub-TLV message 900. The Length field 903 of the message 900 may contain a number of octets of a Value field and may be twenty. The Flags field 905 may be used to indicate a one-step operation or a two-step operation. The Type field 901 may be used to identify, for instance, a PTP sub-TLV such as defined in Table 19 Values of messageType field in IEEE 1588-2008, *IEEE Standard for a Precision Clock Synchronization Protocol for Networked Measurement and Control Systems*, http://ieeexplore.ieee.org/xpl/articleDetails.jsp?arnumber=4579760. The Port ID field 913 may be ten octets. Further, the Port ID field 913 may contain an identity of a source port such as defined in IEEE 1588-2008, *IEEE Standard for a Precision Clock Synchronization Protocol for Networked Measurement and Control Systems*, http://ieeexplore.ieee.org/xpl/articleDetails.jsp?arnumber=4579760. The Sequence ID field 915 may be a sequence ID of a PTP message carried in the Value field of the message.

Figure 10:
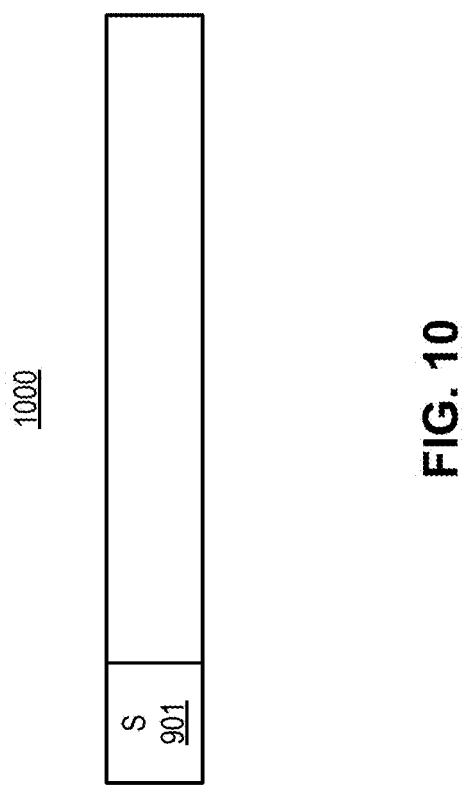
FIG. 10 provides a format of the FLAGS field of the PTP sub-TLV of FIG. 9 in accordance with various aspects as described herein.

FIG. 10 provides a format of a Flags field 1000 of the PTP sub-TLV of FIG. 9 in accordance with various aspects as described herein. The Flags field 1000 may define an S-bit 1001. The S-bit 1001 may be used to determine whether a current message has been processed by a one-step operation or a two-step operation. For instance, the S-bit 1001 may be cleared if the current message has been handled exclusively using the one-step operation and there is no follow-up message. Alternatively, the S-bit 1001 may be set if there has been at least one two-step operation and a follow-up message is forthcoming.

In another embodiment, for a CPRI flow, a sub-TLV message may be used in a similar way to allow one-step operation or two-step operation. In this case, a "follow-up" message may be used, where a Sequence ID field and a CPRI Flow identifier field may allow an association between a residence time and a related CPRI packet. For instance, a CPRI flow identifier may be generated by an IWF and may be associated to a specific CPRI flow such as by using a MAC SA or a VID.

Figure 11:
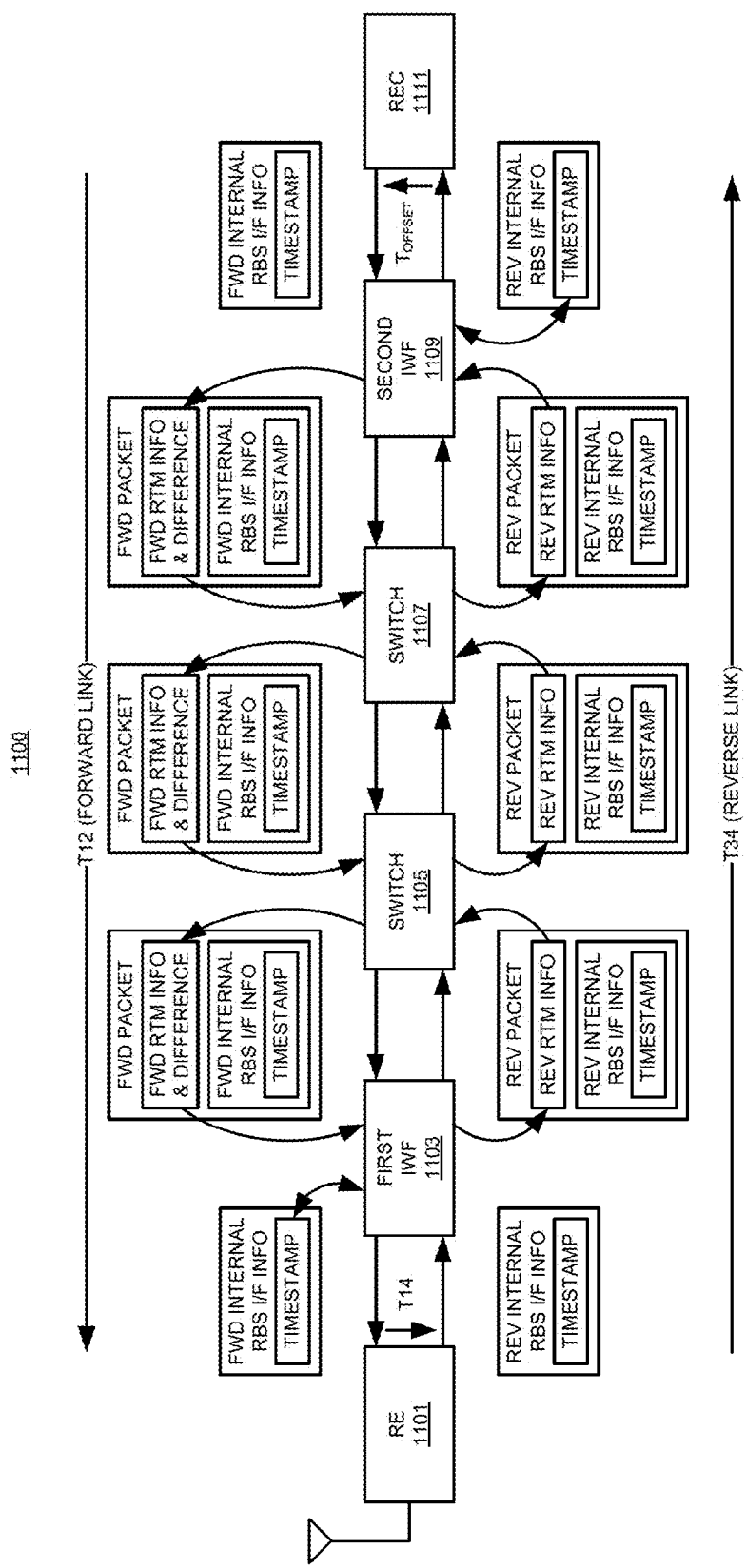
FIG. 11 illustrates another embodiment of an RBS system transporting internal RBS interface information over a packet switched network in accordance with various aspects as described herein.

FIG. 11 illustrates another embodiment of an RBS system transporting internal RBS interface information over a packet switched network in accordance with various aspects as described herein. In FIG. 11, the system 1100 may be configured to include an RE 1101, a first IWF 1103, a first switch 1105, a second switch 1107, a second IWF 1109 and an REC 1111. The RE 1101 may be operationally coupled to the first IWF 1103, which may also be referred to as the first IWF 1103 being attached to the RE 1101. Further, the REC 1111 may be operationally coupled to the second IWF 1109, which may also be referred to as the second IWF 1109 being attached to the REC 1111. The first IWF 1103 and the second IWF 1109 may be operationally coupled using a first switch 1105 and a second switch 1107 of the packet network. The first switch 1105 and the second switch 1107 may be used to facilitate packet communications between the first IWF 1103 and the second IWF 1109. The first and second IWFs 1103 and 1109 and the first and second switches 1105 and 1107 may use RTM. The first and second IWFs 1103 and 1109 may be standalone devices. However, the RE 1101 may be configured to include the first IWF 1103 and may share resources such as a processor or a memory. Similarly, the REC 1111 may be configured to include the second IWF 1109 and may share resources such as a processor and a memory.

In FIG. 11, in operation, the first IWF 1103 may receive a reverse internal RBS interface information from the RE 1101. In one example, the reverse internal RBS interface information may be a reverse CPRI message. The first IWF 1103 may encapsulate the reverse internal RBS interface information and an RTM header to form a reverse packet. The RTM header may include forward RTM information, reverse RTM information, forward accumulated RTM information, reverse accumulated RTM information, a running difference between forward accumulated RTM information and reverse accumulated RTM information or the like. The reverse internal RBS interface information may include a timestamp corresponding to a time that the RE 1101 received data associated with the reverse internal RBS interface information over an air interface. The first IWF 1103 may determine an RTM associated with a processing time of the first IWF 1103 from receiving the reverse internal RBS interface information to transmitting the reverse packet. Further, the first IWF 1103 may initialize the reverse RTM information in the RTM header of the reverse packet using the RTM associated with the processing time of the first IWF 1103.

Furthermore, the first switch 1105 may receive the reverse packet from the first IWF 1103. The first switch 1105 may determine an RTM associated with a processing time of the first switch 1105 from receiving to transmitting the reverse packet. Further, the first switch 1105 may update the reverse RTM information of the reverse packet using the RTM associated with the processing time of the first switch 1105 to obtain the reverse accumulated RTM information of the reverse packet. Similarly, the second switch 1107 may receive the reverse packet from the first switch 1105. The second switch 1107 may determine an RTM associated with a processing time of the second switch 1107 from receiving to transmitting the reverse packet. Further, the second switch 1107 may update the reverse accumulated RTM information of the reverse packet using the RTM associated with the processing time of the second switch 1107.

In the current embodiment, the second IWF 1109 may receive the reverse packet from the second switch 1107. The second IWF 1109 may decapsulate the reverse packet to obtain the reverse internal RBS interface information and the RTM header. The second IWF 1109 may determine an RTM associated with a processing time of the second IWF 1109 from receiving the reverse packet to sending the reverse internal RBS interface information to the REC 1111. Further, the second IWF 1109 may update the reverse accumulated RTM information of the reverse packet using the RTM associated with the processing time of the second IWF 1109. The second IWF 1109 may use the reverse accumulated RTM information to determine a PDV compensation that compensates for the PDV of the reverse packet on the reverse link. Further, the second IWF 1109 may apply the PDV compensation to a transmission time of the reverse internal RBS interface information to obtain a compensated transmission time. The second IWF 1109 may transmit the reverse internal RBS interface information to the REC 1111 at the compensated transmission time.

In FIG. 11, the second IWF 1109 may receive a forward internal RBS interface information from the REC 1111. In one example, the forward internal RBS interface information may be a forward CPRI message. The second IWF 1109 may encapsulate the forward internal RBS interface information and an RTM header to form a forward packet. The second IWF 1109 may determine an RTM associated with a processing time of the second IWF 1109 from receiving the forward internal RBS interface information to sending the forward packet. Further, the second IWF 1109 may initialize the forward RTM information in the RTM header of the forward packet using the RTM associated with the processing time of the forward packet by the second IWF 1109. The second IWF 1109 may determine an additive inverse of the reverse accumulated RTM information of the RTM header of the corresponding reverse packet. Further, the second IWF 1109 may initialize the reverse accumulated RTM information in the RTM header of the forward packet using the additive inverse of the reverse accumulated RTM information of the corresponding reverse packet.

Furthermore, the second switch 1107 may receive the forward packet from the second IWF 1109. The second switch 1107 may determine an RTM associated with a processing time of the second switch 1107 from receiving to transmitting the forward packet. Further, the second switch 1107 may update the forward RTM information in the RTM header of the forward packet using the RTM associated with the processing time of the second switch 1107 to obtain a forward accumulated RTM information of the forward packet. Further, the second switch 107 may update the difference between the forward accumulated RTM information and the reverse accumulated RTM information in the RTM header using the RTM associated with the processing time of the second switch 1107.

Similarly, the first switch 1105 may receive the forward packet from the second switch 1107. The first switch 1105 may determine an RTM associated with a processing time of the first switch 1105 from receiving to transmitting the forward packet. Further, the first switch 1105 may update the forward accumulated RTM information in the RTM header of the forward packet using the RTM associated with the processing time of the first switch 1105. Further, the first switch 105 may update the difference between the forward accumulated RTM information and the reverse accumulated RTM information in the RTM header of the forward packet using the RTM associated with the processing time of the first switch 1105.

In the current embodiment, the first IWF 1103 may receive the forward packet from the first switch 1105. The first IWF 1103 may decapsulate the forward packet to obtain the forward internal RBS interface information and the RTM header. The first IWF 1103 may determine an RTM associated with a processing time of the first IWF 1103 from receiving the forward packet to transmitting the forward internal RBS interface information to the RE 1101. Further, the first IWF 1103 may update the forward accumulated RTM information in the RTM header of the forward packet using the RTM associated with the processing time of the first IWF 1103. Also, the first IWF 1103 may update the difference between the forward accumulated RTM information and the reverse accumulated RTM information in the RTM header of the forward packet using the RTM associated with the processing time of the first IWF 1103.

In addition, the first IWF 1103 may determine an asymmetry compensation that compensates for an asymmetry between processing times on the forward link and the reverse link between the RE and the REC. The asymmetry compensation may be the difference between the forward accumulated RTM information and the reverse accumulated RTM information. The first IWF 1103 may apply the asymmetry compensation to the timestamp of the forward internal RBS interface information. The first IWF 1103 may use the forward accumulated RTM information to determine a packet delay variation (PDV) compensation that compensates for the PDV of the forward packet on the forward link. In one example, the PDV compensation may be relative to a predetermined delay. Further, the first IWF 1103 may apply the PDV compensation to a transmission time of the forward internal RBS interface information to obtain a compensated transmission time. The first IWF 1103 may transmit the forward internal RBS interface information to the REC 1111 at the compensated transmission time.

Figure 12:
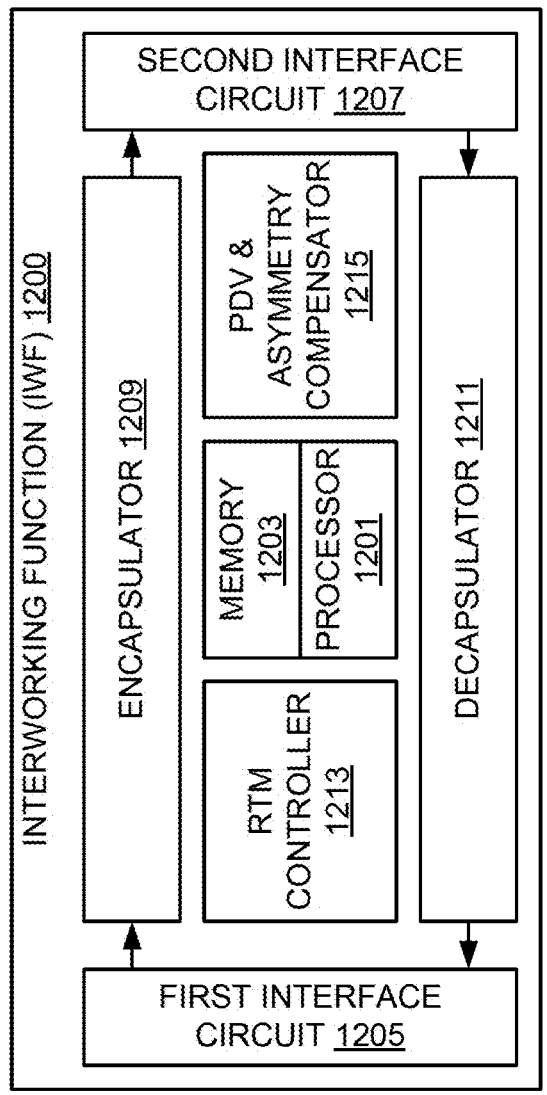
FIG. 12 illustrates another embodiment of an IWF with various aspects as described herein.

FIG. 12 illustrates another embodiment of an IWF 1200 with various aspects as described herein. In FIG. 12, the IWF 1200 may be configured to include a processor 1201 and a memory 1203 and may include additional hardware, software or firmware. In one example, the additional hardware, software or firmware of the IWF 1200 may include a first interface circuit 1205, a second interface circuit 1207, an encapsulator 1209, a decapsulator 1211, an RTM controller 1213, a PDV and asymmetry compensator 1215, or the like. The first interface 1205 may be configured to allow the IWF 1200 to interface to the RE or the REC. The second interface may be configured to allow the IWF 1200 to interface to a packet switched network. The encapsulator 1209 may be used to encapsulate a network header, a PW header, an RTM header, internal RBS interface information, or the like. The network header may include an IP header, or the like. The PW header may include an MPLS header, an L2TPv3 header, or the like. The decapsulator 1211 may be used to analyze and remove the network header and the PW header and to decapsulate the RTM header, the internal RBS interface information, and the like. The RTM controller 1213 may be configured to perform any of the various RTM functions described herein. The PDV and asymmetry compensator 1215 may be configured to perform any of the various PDV compensating functions or the asymmetry compensating functions described herein.

Figure 13:
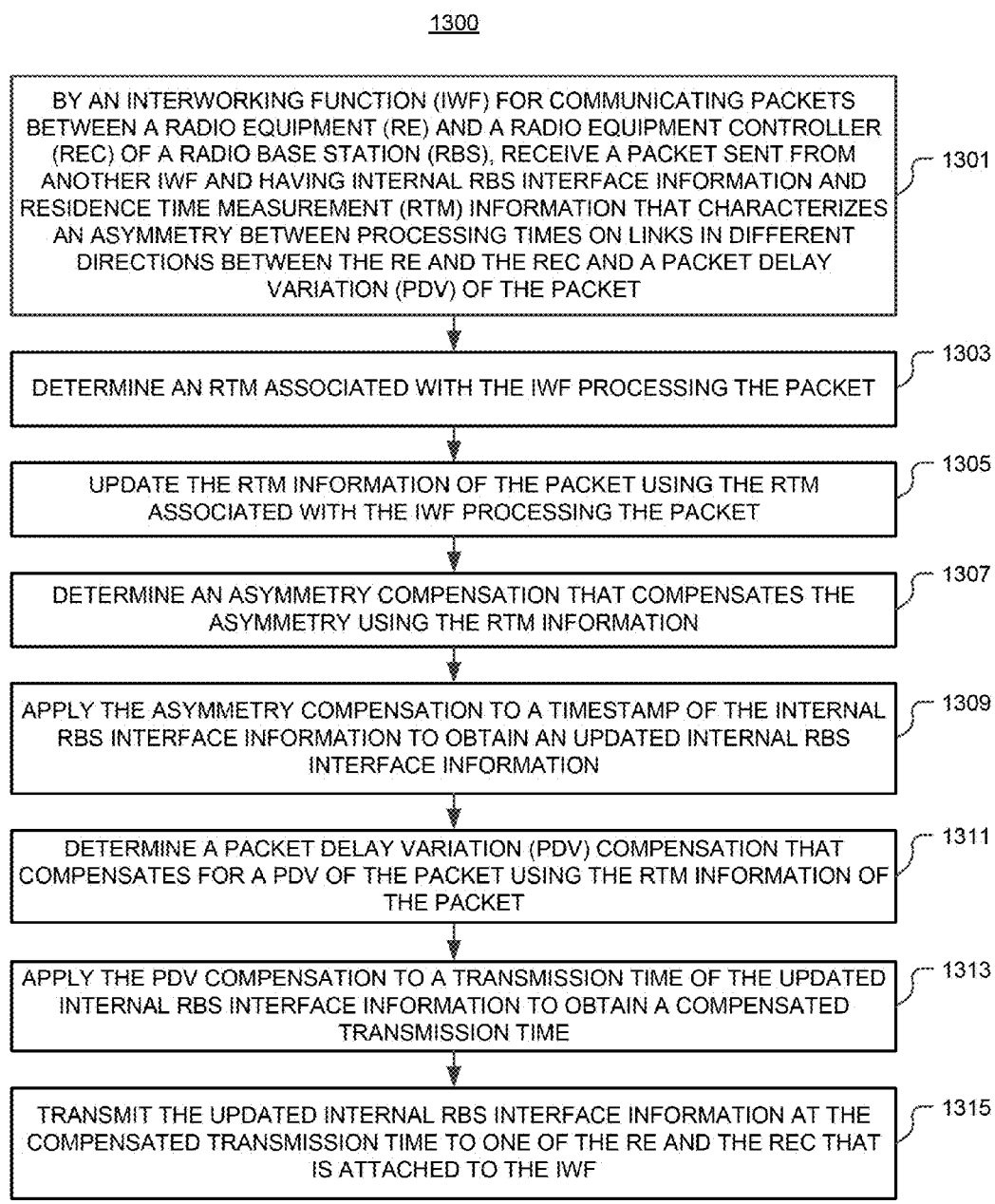
FIG. 13 provides one embodiment of a method of communicating packets between an RE and an REC of an RBS in accordance with various aspects as described herein.

FIG. 13 provides one embodiment of a method 1300 of communicating packets between an RE and an REC of an RBS in accordance with various aspects as described herein. In FIG. 13, the method 1300 may be performed by an IWF for communicating packets between an RE and an REC of an RBS. Further, the method 1300 may start, for instance, at block 1301 where it may include receiving a packet sent from another IWF and having internal RBS interface information and residence time measurement (RTM) information that characterizes an asymmetry between processing times on links in different directions between the RE and the REC and a packet delay variation (PDV) of the packet. At block 1303, the method 1300 may include determining an RTM associated with the IWF processing the packet. At block 1305, the method 1300 may include updating the RTM information of the packet using the RTM associated with the IWF processing the packet. At block 1307, the method 1300 may include determining an asymmetry compensation that compensates the asymmetry using the RTM information. At block 1309, the method 1300 may include applying the asymmetry compensation to a timestamp of the internal RBS interface information to obtain an updated internal RBS interface information. At block 1311, the method may include determining a PDV compensation that compensates for a PDV of the packet using the RTM information of the packet. At block 1313, the method 1300 may include applying the PDV compensation to a transmission time of the updated internal RBS interface information to obtain a compensated transmission time. At block 1315, the method 1300 may include transmitting the updated internal RBS interface information at the compensated transmission time to one of the RE and the REC that is attached to the IWF.

FIG. 14 provides another embodiment of a method 1400 of communicating packets between an RE and an REC of an RBS in accordance with various aspects as described herein. In FIG. 14, the method 1400 may be performed by a first IWF for communicating packets between an RE and an REC of an RBS. Further, the method 1400 may start, for instance, at block 1401 where it may include receiving a forward packet sent from the second IWF and having a forward RTM information that characterizes a PDV of the forward packet on a forward link. At block 1403, the method 1400 may include determining an RTM associated with the first IWF processing the forward packet. At block 1405, the method 1400 may include updating the forward RTM information of the forward packet using the RTM associated with the first IWF processing the forward packet. At block 1407, the method 1400 may include determining a PDV compensation that compensates the PDV of the forward packet on the forward link using the forward RTM information. At block 1409, the method 1400 may include applying the PDV compensation to a transmission time of the forward internal RBS interface information to obtain a compensated transmission time. At block 1411, the method 1400 may include transmitting, to the RE, the updated forward internal RBS interface information at the compensated transmission time.

Figure 15:
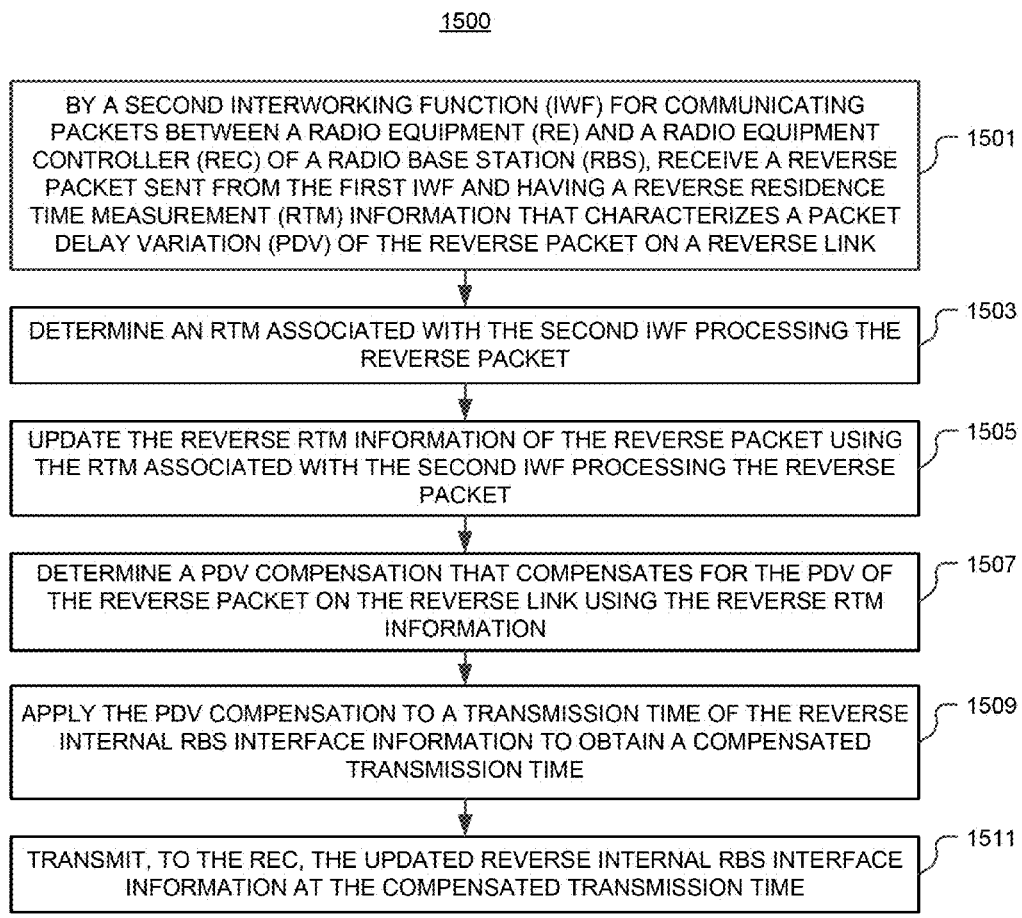
FIG. 15 provides another embodiment of a method of communicating packets between an RE and an REC of an RBS in accordance with various aspects as described herein.

FIG. 15 provides another embodiment of a method 1500 of communicating packets between an RE and an REC of an RBS in accordance with various aspects as described herein. In FIG. 15, the method 1500 may be performed by a second IWF for communicating packets between an RE and an REC of an RBS. Further, the method 1500 may start, for instance, at block 1501 where it may include receiving a reverse packet sent from the first IWF and having a reverse RTM information that characterizes a PDV of the reverse packet on a reverse link. At block 1503, the method 1500 may include determining an RTM associated with the second IWF processing the reverse packet. At block 1505, the method 1500 may include updating the reverse RTM information of the reverse packet using the RTM associated with the second IWF processing the reverse packet. At block 1507, the method 1500 may include determining a PDV compensation that compensates the PDV of the reverse packet on the reverse link using the reverse RTM information. At block 1509, the method 1500 may include applying the PDV compensation to a transmission time of the reverse internal RBS interface information to obtain a compensated transmission time. At block 1511, the method 1500 may include transmitting, to the REC, the updated reverse internal RBS interface information at the compensated transmission time.

Figure 16:
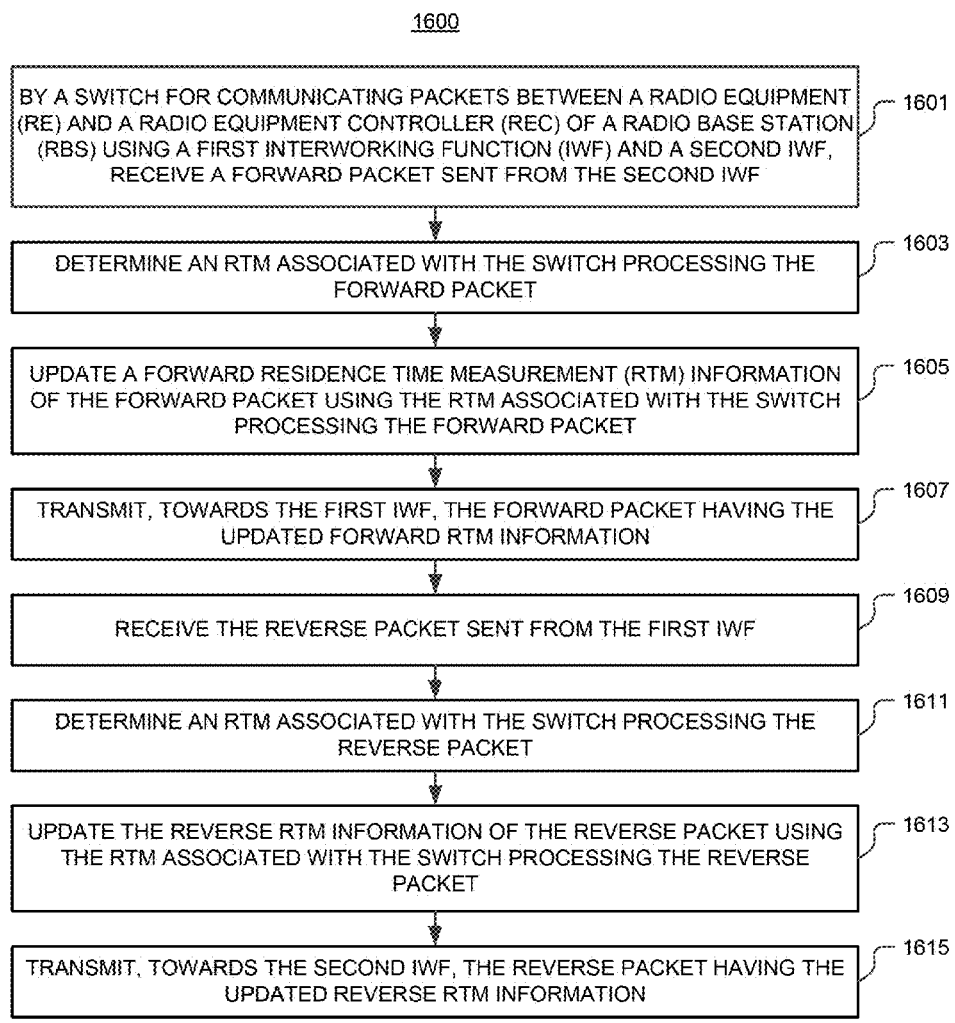
FIG. 16 provides another embodiment of a method of communicating packets between an RE and an REC of an RBS in accordance with various aspects as described herein.

FIG. 16 provides another embodiment of a method 1600 of communicating packets between an RE and an REC of an RBS in accordance with various aspects as described herein. In FIG. 16, the method 1600 may be performed by a switch for communicating packets between an RE and an REC of an RBS using a first IWF and a second IWF. Further, the method 1600 may start, for instance, at block 1601 where it may include receiving the forward packet sent from the second IWF. At block 1603, the method may include determining an RTM associated with the switch processing the forward packet. At block 1605, the method may include updating a forward RTM information of the forward packet using the RTM associated with the switch processing the forward packet. At block 1607, the method 1600 may include transmitting, towards the first IWF, the forward packet having the updated forward RTM information. At block 1609, the method 1600 may include receiving the reverse packet sent from the first IWF. At block 1611, the method 1600 may include determining an RTM associated with the switch processing the reverse packet. At block 1613, the method 1600 may include updating the reverse RTM information of the reverse packet using the RTM associated with the switch processing the reverse packet. At block 1615, the method 1600 may include transmitting, towards the second IWF, the reverse packet having the updated reverse RTM information.

In another embodiment, in an interworking function (IWF) for communicating packets between a radio equipment (RE) and a radio equipment controller (REC) of a radio base station (RBS), a method may include receiving a packet sent from another IWF and having internal RBS interface information and residence time measurement (RTM) information that characterizes an asymmetry between processing times on links in different directions between the RE and the REC. Further, the method may include determining an asymmetry compensation that compensates for the asymmetry using the RTM information. Also, the method may include applying the asymmetry compensation to a timestamp of the internal RBS interface information to obtain an updated internal RBS interface information. In addition, the method may include transmitting the updated internal RBS interface information to one of the RE and the REC that is attached to the IWF.

In another embodiment, asymmetry compensation may be applied by delaying a transmission of the internal RBS interface information by about the asymmetry compensation.

In another embodiment, asymmetry compensation may be applied to a transmission time of internal RBS interface information to obtain a compensated transmission time. Further, the internal RBS interface information may be transmitted to the RE or the REC at the compensated transmission time.

In another embodiment, the method may include determining an RTM associated with the IWF processing the packet. Further, the method may include updating the RTM information of the packet using the RTM associated with the IWF processing the packet.

In another embodiment, the method may include determining a PDV compensation that compensates a PDV of the packet using the RTM information of the packet. The RTM information may also characterizes the PDV of the packet on a link from the other IWF to the IWF. Further, the method may include applying the PDV compensation to a transmission time of the updated internal RBS interface information to obtain an updated transmission time. Also, the method may include transmitting the updated internal RBS interface information at the compensated transmission time to the one of the RE and the REC that is attached to the IWF.

In another embodiment, the internal RBS interface information may include CPRI information.

In another embodiment, the packet may include PTP information.

In another embodiment, the IWF may not use a precision time protocol (PTP).

In another embodiment, the packet may include an RTM header having the RTM information of the packet.

In another embodiment, the packet may be a PW emulation packet.

In another embodiment, the RTM information of the packet may include a forward accumulated RTM and a reverse accumulated RTM, or a difference between the forward accumulated RTM and the reverse accumulated RTM and one of the forward accumulated RTM and the reverse accumulated RTM.

In another embodiment, an IWF for communicating packets between an RE and an REC of an RBS may be configured to include a processor operationally coupled to a first interface circuit and a second interface circuit. The first interface circuit may be configured to receive a packet sent from another IWF and having an internal RBS interface information and an RTM information that characterizes an asymmetry between processing times on links in different directions between the RE and the REC. Further, the processor may be configured to determine the asymmetry compensation that compensates the asymmetry using the RTM information. The processor may be further configured to apply the asymmetry compensation to a timestamp of the internal RBS interface information to obtain an updated internal RBS interface information. Also, the second interface circuit may be configured to transmit the updated internal RBS interface information to one of the RE and the REC that is attached to the IWF.

In another embodiment, the processor may be further configured to determine an RTM associated with the IWF processing the packet. Further, the processor may be further configured to update the RTM information of the packet using the RTM associated with the IWF processing the packet.

In another embodiment, the processor may be further configured to determine a PDV compensation that compensates a PDV of the packet using the RTM information of the packet. The RTM information may also characterize the PDV of the packet on a link from the other IWF to the IWF. Further, the processor may be configured to apply the PDV compensation to a transmission time of the updated internal RBS interface information to obtain a compensated transmission time.

In another embodiment, the second interface circuit may be further configured to transmit the updated internal RBS interface information at the compensated transmission time to the one of the RE and the REC that is attached to the IWF.

In another embodiment, a system for communicating packets between an RE and an REC of an RBS may be configured to include a first IWF operationally coupled to the RE and a second IWF operationally coupled between the first IWF and the REC. The first IWF may be configured to receive a forward packet transmitted from the second IWF having a forward internal RBS interface information and a forward RTM information that characterizes a forward PDV of the forward packet on a forward link. In addition, the first IWF may be further configured to determine a forward PDV compensation that compensates for the forward PDV using the forward RTM information. The first IWF may be further configured to apply the forward PDV compensation to a forward transmission time of the forward internal RBS interface information to obtain a compensated forward transmission time. Also, the first IWF may be further configured to transmit, to the RE, the updated forward internal RBS interface information at the compensated forward transmission time. The second IWF may be configured to receive a reverse packet sent from the first IWF and having a reverse internal RBS interface information and a reverse RTM information that characterizes a reverse PDV of the reverse packet on a reverse link. In addition, the second IWF may be further configured to determine a reverse PDV compensation that compensates for the reverse PDV using the reverse RTM information. Also, the second IWF may be further configured to apply the reverse PDV compensation to a reverse transmission time of the reverse internal RBS interface information to obtain a compensated reverse transmission time. The second IWF may be configured to transmit, to the REC, the updated reverse internal RBS interface information at the compensated reverse transmission time.

In another embodiment, the first IWF may be further configured to determine an RTM associated with the first IWF processing the forward packet. In addition, the first IWF may be further configured to update the forward RTM information of the forward packet using the RTM associated with the first IWF processing the forward packet. The first IWF may be further configured to determine an RTM associated with the first IWF processing the reverse packet. Also, the first IWF may be further configured to update the reverse RTM information of the reverse packet using the RTM associated with the first IWF processing the reverse packet.

In another embodiment, the second IWF may be further configured to determine an RTM associated with the second IWF processing the forward packet. In addition, the second IWF may be further configured to update the forward RTM information of the forward packet using the RTM associated with the second IWF processing the forward packet. The second IWF may be further configured to determine an RTM associated with the second IWF processing the reverse packet. Also, the second IWF may be further configured to update the reverse RTM information of the reverse packet using the RTM associated with the second IWF processing the reverse packet.

In another embodiment, the system may be further configured to include a switch operationally coupled between the first IWF and the second IWF. The switch may be configured to receive the forward packet sent from the second IWF. In addition, the switch may be further configured to determine an RTM associated with the switch processing the forward packet. The switch may be further configured to update the forward RTM information of the forward packet using the RTM associated with the switch processing the forward packet. Also, the switch may be further configured to transmit, towards the first IWF, the forward packet having the updated forward RTM information.

In another embodiment, the system may be further configured to include a switch operationally coupled between the first IWF and the second IWF. The switch may be configured to receive the reverse packet sent from the first IWF. In addition, the switch may be further configured to determine an RTM associated with the switch processing the reverse packet. The switch may be further configured to update the reverse RTM information of the reverse packet using the RTM associated with the switch processing the reverse packet. Also, the switch may be further configured to transmit, towards the second IWF, the reverse packet having the updated reverse RTM information.

In another embodiment, the RTM information may also characterizes an asymmetry between processing times on links in different directions between the RE and the REC.

In another embodiment, the first IWF may be further configured to determine an asymmetry compensation that compensates the asymmetry using the forward RTM information. In addition, the first IWF may be further configured to apply the asymmetry compensation to a timestamp of the updated forward internal RBS interface information.

In another embodiment, the second IWF may be further configured to determine an asymmetry compensation that compensates the asymmetry using the reverse RTM information. In addition, the second IWF may be further configured to apply the asymmetry compensation to a timestamp of the updated reverse internal RBS interface information.

In another embodiment, an REC may transmit to an RE an accumulated reverse RTM information associated with a reverse internal RBS interface information to allow the RE to determine a PDV compensation or an asymmetry compensation associated with a corresponding forward internal RBS interface information.

In another embodiment, an RE may transmit to an REC an accumulated forward RTM information associated with a forward internal RBS interface information to allow the REC to determine a PDV compensation or an asymmetry compensation associated with a corresponding reverse internal RBS interface information.

Figure 17:
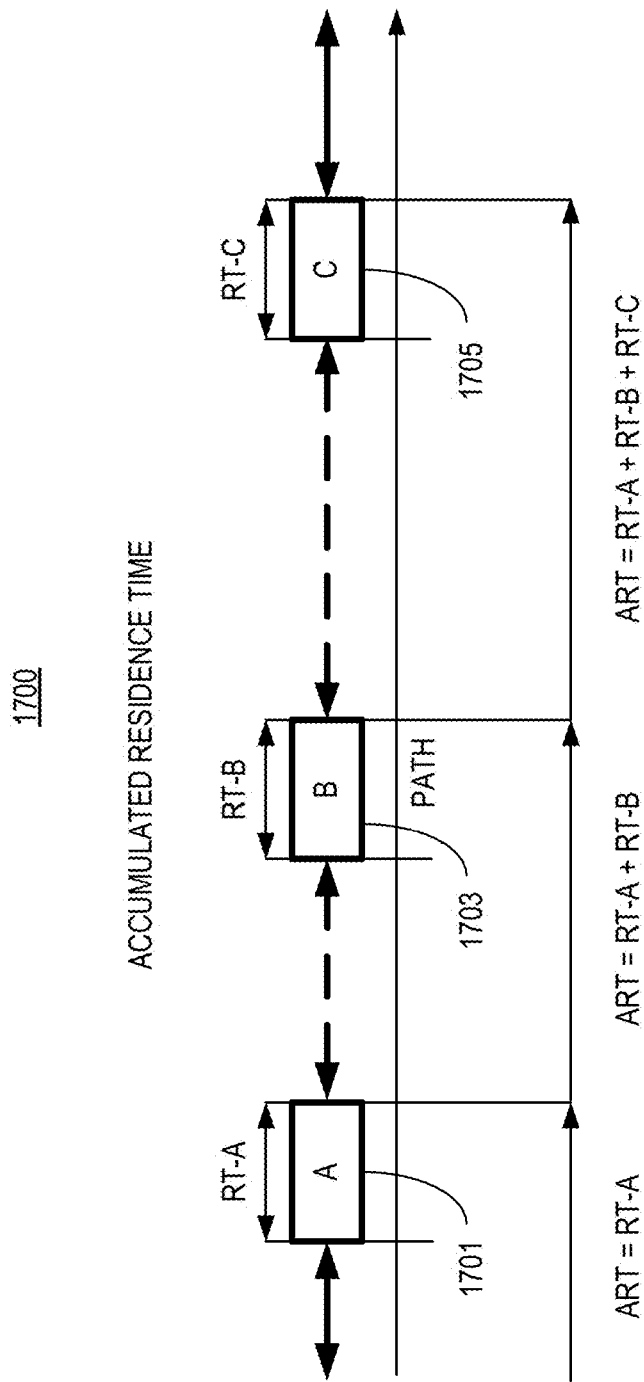
FIG. 17 provides an example application of one embodiment of a system for using accumulated residence time to shape packet traffic and reduce packet delay variation in accordance with various aspects as described herein.

FIG. 17 provides an example application of one embodiment of a system 1700 for using accumulated residence time to shape packet traffic and reduce packet delay variation in accordance with various aspects as described herein. In FIG. 17, the system 1700 shows that accumulated residence time may be used to shape packet traffic and reduce delay variation. A residence time may be measured at each packet switch 1701, 1703 and 1705 in a packet-switched network as the difference between packet arrival time at a given switch and packet departure time for the same packet from the same switch. Accumulated residence time may be measured by adding the locally measured residence time to a field of a corresponding packet that contains the sum of residence times of all prior switches on a unidirectional path. When a packet reaches the end of a residence time domain, the field of the packet may contain the cumulative residence time for each packet switch 1701, 1703 and 1705 on the path. On a given path, there may be two components of delay. A first delay may be a propagation delay such as a light speed delay. A second delay may be a variable delay such as a processing time (e.g., RT-A, RT-B and RT-C) for processing, handling, managing, buffering, or the like a packet in a packet switch. Further, a switch residence time may include all of the variable delay components for the switch. An accumulated residence time (ART) may include all of the variable delays (e.g., RT-A+RT-B+RT-C) across all residence time measuring switches 1701, 1703 and 1705 on a path (in an RTM domain). Shaping may be performed using the ART, for instance, by adjusting or normalizing the delay. Over time, all packets may experience precisely similar delay. Hence, delay variation may then be at a minimum.

Figure 18:
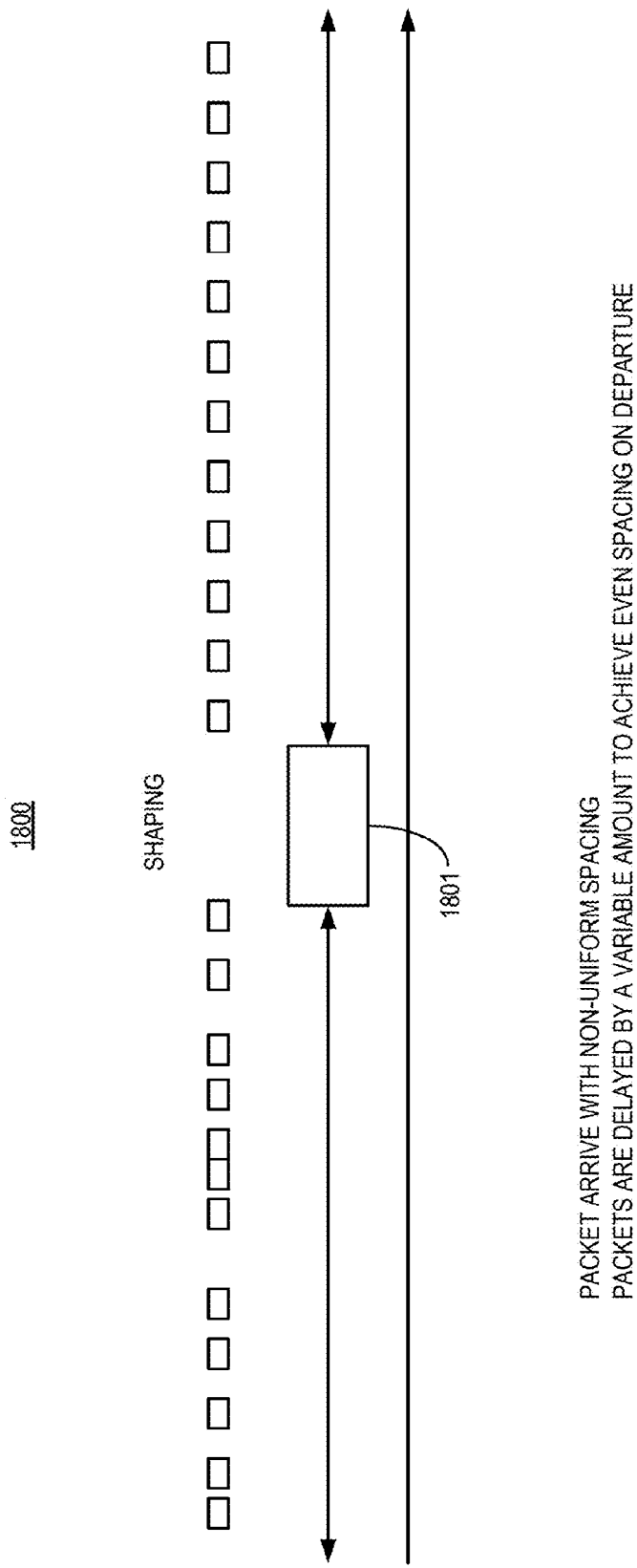
FIG. 18 provides an example application of another embodiment of a system for using accumulated residence time to shape packet traffic and reduce packet delay variation in accordance with various aspects as described herein.

FIG. 18 provides an example application of one embodiment of a system 1800 for using accumulated residence time to shape packet traffic and reduce packet delay variation in accordance with various aspects as described herein. As shown in FIG. 18, shaping may be used to spread packets out uniformly to achieve an even distribution in time according to a determined delivery rate. For example, typical shaping may be used to ensure that a delivery rate of a packet does not exceed a maximum delivery rate measured over a predetermined time. Shaping may also be used with gradually changing packet arrival rates to minimize effects of "burstiness" in traffic. Shaping may be done by a switch 1801 adding delay in delivering each packet in a series of packets to achieve a more even distribution in time. Shaping may also be performed by the switch 1801 to match a common delay.

In FIG. 18, packets cannot depart from the switch 1801 faster than they arrive. Thus, to achieve as near zero delay variation as possible, packets must be delayed by the switch 1801 an amount greater than or equal to zero. The amount of delay for each packet may be an amount required to result in a total delay being about equivalent to the maximum delay experienced by any packet delivered by the switch 1801 as part of a stream of packets on a given path. It is important to recognize that a packet, which directly observes the maximum delay, cannot experience less delay through shaping.

In another embodiment, in response to a first packet arriving, a device such as a switch or IFW may store an ART of the first packet as a maximum ART and may transmit the packet immediately (with about delay zero time). However, the first packet may be delayed by some amount, which may be a predetermined amount. If the configured minimum delay is greater than the ART of the first packet, then (1) store the minimum delay as the initial value for the maximum ART, (2) wait the amount of time representing a difference between the ART of the first packet and the maximum ART; and (3) transmit the first packet. Otherwise, if the configured minimum delay is no more than the ART of the first packet, then store the ART of the first packet as the maximum ART and transmit the first packet immediately. As a subsequent packet arrives, compare an ART of the subsequent packet to the maximum ART. If the ART of the subsequent packet is greater than the maximum ART, then store the ART of the subsequent packet at the maximum ART, and transmit the subsequent packet immediately. Otherwise, if the ART of the subsequent packet is no more than the maximum ART, then (1) determine a difference between the ART of the subsequent packet and the maximum ART, (2) wait the amount of time represented by the difference, and (3) transmit the subsequent packet.

In another embodiment, an initial value may be configured for the maximum ART before any packets arrive. The maximum ART may be anything from zero to a maximum acceptable delay. As a subsequent packet arrives, an ART of the subsequent packet may be compared to the maximum ART. If the ART of the subsequent packet is greater than the maximum ART, then store the ART of the subsequent packet as the maximum ART, and transmit the subsequent packet immediately. Otherwise, if the ART of the subsequent packet is no more than the maximum ART, then (1) determine a difference between the ART of the subsequent packet and the maximum ART, (2) wait an amount of time representing the difference, and (3) transmit the subsequent packet.

In another embodiment, an initial value may be configured for a maximum ART and a maximum acceptable delay before any packets arrive. The initial value of the maximum ART may be anything from zero to the configured maximum acceptable delay. A value of the maximum acceptable delay may be determined based on a delay budget dictated by an application, if any. As a subsequent packet arrives, an ART of the subsequent packet may be compared to the maximum ART. If the ART of the subsequent packet is greater than the maximum ART, then (1) compare the ART of the subsequent packet to the maximum acceptable delay, (2) if the ART of the subsequent packet is no more than the maximum acceptable delay, then store the ART of the subsequent packet as a new value of the maximum ART, and (3) transmit the subsequent packet immediately. Otherwise, if the ART of the subsequent packet is no more the maximum ART, then (1) determine a difference between the ART of the subsequent packet and the maximum ART, wait an amount of time represented by the difference, and (3) transmit the packet.

In another embodiment, an initial value may be configured for a maximum ART and a maximum acceptable delay before any packets arrive. The initial value for the maximum ART may be anything from zero to the configured maximum acceptable delay. The value of the maximum acceptable delay may be determined based on a delay budget dictated by an application, if any. As a subsequent packet arrives, an ART of the subsequent packet may be compared to the maximum ART. If the ART of the subsequent packet is greater than the maximum ART, then (1) compare the ART of the subsequent packet to the maximum acceptable delay, (2) if the ART of the subsequent packet is no more than the maximum acceptable delay, then store the ART of the subsequent packet as a new value of the maximum ART, and (3) transmit the subsequent packet immediately. Otherwise, if the ART of the subsequent packet is no more than the maximum ART, then (1) determine a difference between the ART of the subsequent packet and the maximum ART, (2) wait an amount of time represented by the difference, and (3) transmit the subsequent packet.

These embodiments for shaping packet traffic using ART may be independent of the approach used to correct for path delay asymmetry. If used in conjunction with asymmetry correction, these embodiments may need to be modified for the opposite path such as the reverse path. These embodiments used to determine asymmetry may result in an ART that is less than zero for the opposite path. The ART value in this case may be "poisoned" since it is influenced by the value of ART carried forward from the forward portion of the path. Hence, the IWF may need to treat two-way delay measurement PDUs differently from other PDUs. These embodiments may be further enhanced. For instance, a function can be added to determine if reducing the maximum ART would make sense such as if the maximum ART has increased due to a short term packet congestion condition.

Abbreviations:
CPRI Common Public Radio Interface
MAC SA Media Access Control Source Address
PDV Packet Delay Variation
PSN Packet Switched Network
PTP Precision Time Protocol
RTM Residence Time Measurement
VID VLAN Id The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

What is claimed is:

1. A method performed by an interworking function (IWF) for communicating packets between a radio equipment (RE) and a radio equipment controller (REC) of a radio base station (RBS), comprising:
   receiving a packet sent from another IWF and having internal RBS interface information and residence time measurement (RTM) information that characterizes an asymmetry between processing times on links in different directions between the RE and the REC;
   determining an asymmetry compensation that compensates for the asymmetry using the RTM information; and
   applying the asymmetry compensation to a timestamp of the internal RBS interface information to obtain an updated internal RBS interface information; and
   transmitting the updated internal RBS interface information to one of the RE and the REC that is attached to the IWF.

2. The method of claim 1, further comprising:
   determining an RTM associated with the IWF processing the packet; and
   updating the RTM information of the packet using the RTM associated with the IWF processing the packet.

3. The method of claim 1, further comprising:
   determining a packet delay variation (PDV) compensation that compensates a PDV of the packet using the RTM information of the packet, wherein the RTM information also characterizes the PDV of the packet on a link from the other IWF to the IWF;
   applying the PDV compensation to a transmission time of the updated internal RBS interface information to obtain an updated transmission time; and
   wherein transmitting includes transmitting the updated internal RBS interface information at the compensated transmission time to the one of the RE and the REC that is attached to the IWF.

4. The method of claim 1, wherein the internal RBS interface information includes common public radio interface (CPRI) information.

5. The method of claim 1, wherein the packet includes precision time protocol (PTP) information.

6. The method of claim 1, wherein the packet includes an RTM header having the RTM information of the packet.

7. The method of claim 1, wherein the packet is a pseudo-wire emulation packet.

8. The method of claim 1, wherein the RTM information of the packet includes a forward accumulated RTM and a reverse accumulated RTM, or a difference between the forward accumulated RTM and the reverse accumulated RTM.

9. The method of claim 1, wherein the IWF does not use a precision time protocol (PTP).

10. An interworking function (IWF) for communicating packets between a radio equipment (RE) and a radio equipment controller (REC) of a radio base station (RBS), comprising:
    a first interface circuit configured to receive a packet sent from another IWF and having internal RBS interface information and a residence time measurement (RTM) information that characterizes an asymmetry between processing times on links in different directions between the RE and the REC;
    a processor operationally coupled to the first interface and configured to:
      determine the asymmetry compensation that compensates the asymmetry using the RTM information; and
      apply the asymmetry compensation to a timestamp of the internal RBS interface information to obtain an updated internal RBS interface information; and
    a second interface circuit operationally coupled to the processor and configured to transmit the updated internal RBS interface information to one of the RE and the REC that is attached to the IWF.

11. The IWF of claim 10, wherein the processor is further configured to:
    determine an RTM associated with the IWF processing the packet; and
    update the RTM information of the packet using the RTM associated with the IWF processing the packet.

12. The IWF of claim 10, wherein the processor is further configured to:
    determine a packet delay variation (PDV) compensation that compensates a PDV of the packet using the RTM information of the packet, wherein the RTM information also characterizes the PDV of the packet on a link from the other IWF to the IWF; and
    apply the PDV compensation to a transmission time of the updated internal RBS interface information to obtain a compensated transmission time; and
    wherein the second interface circuit is further configured to transmit the updated internal RBS interface information at the compensated transmission time to the one of the RE and the REC that is attached to the IWF.

13. The IWF of claim 10, wherein the RTM information of the packet includes a forward accumulated RTM and a reverse accumulated RTM, or a difference between the forward accumulated RTM and the reverse accumulated RTM.

14. The IWF of claim 10, wherein the internal RBS interface information includes common public radio interface (CPRI) information.

15. The IWF of claim 10, wherein the packet includes an RTM header having the RTM information.

16. A system for communicating packets between a radio equipment (RE) and a radio equipment controller (REC) of a radio base station (RBS), comprising:
    a first interworking function (IWF) operationally coupled to the RE;
    a second IWF operationally coupled between the first IWF and the REC;
    wherein the first IWF is configured to:
      receive a forward packet sent from the second IWF and having a forward internal RBS interface information and a forward residence time measurement (RTM)

information that characterizes a forward packet delay variation (PDV) of the forward packet on a forward link;

determine a forward PDV compensation that compensates for the forward PDV using the forward RTM information;

apply the forward PDV compensation to a forward transmission time of the forward internal RBS interface information to obtain a compensated forward transmission time; and transmit, to the RE, the updated forward internal RBS interface information at the compensated forward transmission time; and a second IWF operationally coupled between the first IWF and the REC, wherein the second IWF is configured to:

receive a reverse packet sent from the first IWF and having a reverse internal RBS interface information and a reverse RTM information that characterizes a reverse PDV of the reverse packet on a reverse link;

determine a reverse PDV compensation that compensates for the reverse PDV using the reverse RTM information;

apply the reverse PDV compensation to a reverse transmission time of the reverse internal RBS interface information to obtain a compensated reverse transmission time; and transmit, to the REC, the updated reverse internal RBS interface information at the compensated reverse transmission time.

17. The system of claim 16, wherein the first IWF is further configured to:

determine an RTM associated with the first IWF processing the forward packet;

update the forward RTM information of the forward packet using the RTM associated with the first IWF processing the forward packet;

determine an RTM associated with the first IWF processing the reverse packet; and update the reverse RTM information of the reverse packet using the RTM associated with the first IWF processing the reverse packet.

18. The system of claim 16, wherein the second IWF is further configured to:

determine an RTM associated with the second IWF processing the forward packet; and update the forward RTM information of the forward packet using the RTM associated with the second IWF processing the forward packet;

determine an RTM associated with the second IWF processing the reverse packet; and update the reverse RTM information of the reverse packet using the RTM associated with the second IWF processing the reverse packet.

19. The system of claim 16, further comprising:

a switch operationally coupled between the first IWF and the second IWF, wherein the switch is configured to:

receive the forward packet sent from the second IWF;

determine an RTM associated with the switch processing the forward packet;

update the forward RTM information of the forward packet using the RTM associated with the switch processing the forward packet;

transmit, towards the first IWF, the forward packet having the updated forward RTM information;

receive the reverse packet sent from the first IWF;

determine an RTM associated with the switch processing the reverse packet;

update the reverse RTM information of the reverse packet using the RTM associated with the switch processing the reverse packet; and transmit, towards the second IWF, the reverse packet having the updated reverse RTM information.

20. The system of claim 16, wherein the RTM information also characterizes an asymmetry between processing times on links in different directions between the RE and the REC; and wherein the first IWF is further configured to:

determine an asymmetry compensation that compensates the asymmetry using the forward RTM information; and apply the asymmetry compensation to a timestamp of the updated forward internal RBS interface information.

21. The system of claim 16, wherein the RTM information also characterizes an asymmetry between processing times on links in different directions between the RE and the REC; and wherein the second IWF is further configured to:

determine an asymmetry compensation that compensates the asymmetry using the reverse RTM information; and apply the asymmetry compensation to a timestamp of the updated reverse internal RBS interface information.

* * * * *